United States Patent
Koorapaty et al.

(10) Patent No.: US 11,838,900 B2
(45) Date of Patent: *Dec. 5, 2023

(54) MANAGING OR HANDLING OF UPLINK TRANSMISSIONS IN A COMMUNICATION NETWORK EMPLOYING A LISTEN-BEFORE-TALK-PROCEDURE

(71) Applicant: Telefonaktiebolaget LM Ericsson (publ), Stockholm (SE)

(72) Inventors: Havish Koorapaty, Saratoga, CA (US); Jung-Fu Cheng, Fremont, CA (US); Sorour Falahati, Stockholm (SE); Amitav Mukherjee, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,844

(22) Filed: Jun. 3, 2022

(65) Prior Publication Data
US 2022/0369312 A1 Nov. 17, 2022

Related U.S. Application Data

(63) Continuation of application No. 16/088,677, filed as application No. PCT/IB2017/051880 on Mar. 31, 2017, now Pat. No. 11,375,499.
(Continued)

(51) Int. Cl.
*H04W 72/04* (2023.01)
*H04W 72/0446* (2023.01)
(Continued)

(52) U.S. Cl.
CPC ....... *H04W 72/0446* (2013.01); *H04L 5/0082* (2013.01); *H04L 27/2636* (2013.01);
(Continued)

(58) Field of Classification Search
CPC ... H04W 74/004; H04W 72/21; H04W 72/04; H04W 72/0446; H04L 47/822
See application file for complete search history.

(56) References Cited

U.S. PATENT DOCUMENTS

| 11,375,499 B2 * | 6/2022 | Koorapaty ......... H04L 27/2636 |
| 2013/0324113 A1 * | 12/2013 | Jechoux ............ H04W 72/1215 |
| | | 455/553.1 |

(Continued)

FOREIGN PATENT DOCUMENTS

| EP | 2 696 530 A2 | 2/2014 |
| WO | 2015/116789 A1 | 8/2015 |

(Continued)

OTHER PUBLICATIONS

International Search Report and Written Opinion of the International Searching Authority dated Aug. 22, 2017 issued in corresponding PCT Application No. PCT/IB2017/051880, consisting of 15 pages.
(Continued)

*Primary Examiner* — Salvador E Rivas
(74) *Attorney, Agent, or Firm* — Christopher & Weisberg, P.A.

(57) ABSTRACT

A method in a communication device for managing uplink transmissions from the communication device to a network node. The method includes obtaining a timing advance value, the timing advance value indicating a time period in which the communication device shall advance a first uplink subframe transmission to the network node, obtaining information about a location of a gap within the first uplink subframe, the gap having a predefined duration, the location of the gap occurring after the time period indicated in the timing advance value, and performing the first uplink subframe transmission after the predefined duration.

20 Claims, 13 Drawing Sheets

Related U.S. Application Data

(60) Provisional application No. 62/316,936, filed on Apr. 1, 2016.

(51) Int. Cl.

| | |
|---|---|
| *H04L 5/00* | (2006.01) |
| *H04L 27/26* | (2006.01) |
| *H04W 16/14* | (2009.01) |
| *H04W 56/00* | (2009.01) |
| *H04W 74/08* | (2009.01) |
| *H04W 72/23* | (2023.01) |
| *H04L 47/70* | (2022.01) |
| *H04W 72/21* | (2023.01) |
| *H04W 74/00* | (2009.01) |

(52) U.S. Cl.
CPC ............ *H04L 47/822* (2013.01); *H04W 16/14* (2013.01); *H04W 56/0045* (2013.01); *H04W 72/04* (2013.01); *H04W 72/21* (2023.01); *H04W 72/23* (2023.01); *H04W 74/004* (2013.01); *H04W 74/0808* (2013.01); *H04L 5/0007* (2013.01)

(56) References Cited

U.S. PATENT DOCUMENTS

| | | | |
|---|---|---|---|
| 2014/0086116 A1 | 3/2014 | Seo et al. | |
| 2015/0099525 A1 | 4/2015 | Ji | |
| 2017/0055181 A1 | 2/2017 | Tirola et al. | |
| 2017/0150500 A1 | 5/2017 | Ahn | |
| 2017/0215206 A1 | 7/2017 | Cheng et al. | |
| 2017/0222749 A1 | 8/2017 | Dinan | |
| 2017/0280475 A1* | 9/2017 | Yerramalli | H04W 72/56 |
| 2018/0176875 A1 | 6/2018 | Tirola et al. | |
| 2018/0227958 A1* | 8/2018 | Xiong | H04W 88/023 |
| 2018/0302915 A1* | 10/2018 | Einhaus | H04W 72/1268 |
| 2019/0313450 A1 | 10/2019 | Mukherjee et al. | |

FOREIGN PATENT DOCUMENTS

| | | |
|---|---|---|
| WO | 2015/169359 A1 | 11/2015 |
| WO | 2015/199494 A1 | 12/2015 |
| WO | 2016/022798 A1 | 2/2016 |

OTHER PUBLICATIONS

Written Opinion of the International Preliminary Examining Authority dated Mar. 5, 2018 issued in corresponding PCT Application No. PCT/IB2017/051880, consisting of 11 pages.

Notification of Transmittal of the International Preliminary Report on Patentability dated Jun. 4, 2018 issued in corresponding PCT Application No. PCT/IB2017/051880, consisting of 32 pages.

3GPP TS 36.211 V11.4.0 (Sep. 2013) 3rd Generation Partnership Project; Technical Specification Group Radio Access Network; Evolved Universal Terrestrial Radio Access (E-UTRA); Physical channels and modulation (Release 11), consisting of 120 pages.

3GPP TS 36.213 V11.4.0 (Sep. 2013) 3rd Generation Partnership Project; Technical Specification Group Radio Access Network; Evolved Universal Terrestrial Radio Access (E-UTRA); Physical layer procedures (Release 11), consisting of 182 pages.

3GPP TS 36.331 V11.5.0 (Sep. 2013) 3rd Generation Partnership Project; Technical Specification Group Radio Access Network; Evolved Universal Terrestrial Radio Access (E-UTRA); Radio Resource Control (RRC); Protocol specification (Release 11) Protocol specification (Release 11), consisting of 347 pages.

Indian First Examination Report dated Jan. 7, 2021 issued in corresponding Indian Application No. 201847037014, consisting of 6 pages.

ARIPO Search and Examination Report dated Sep. 28, 2020 issued in corresponding Application No. AP/P/2018/011107, consisting of 4 pages.

ARIPO Decision to Grant dated Feb. 10, 2021 issued in corresponding Application No. AP/P/2018/011107, consisting of 5 pages.

Chinese Office Action and English summary translation of the Chinese Office Action dated Nov. 21, 2022 issued in corresponding Chinese Patent Application No. 201780034105.0, consisting of 10 pages.

3GPP TSG-RAN WG1 #82 R1-153844; Source: Cisco Systems; Title: Uplink Channel Access for LAA; Agenda Item: 7.2.4.1; Document for: Discussion and Decision, Aug. 24-28, 2015, Beijing, China, consisting of 5 pages.

Chinese Office Action and English summary translation of the Chinese Office Action dated Apr. 25, 2023 issued in corresponding Chinese Patent Application No. 201780034105.0, consisting of 9 pages.

\* cited by examiner

MANAGING OR HANDLING OF UPLINK TRANSMISSIONS IN A COMMUNICATION NETWORK EMPLOYING A LISTEN-BEFORE-TALK-PROCEDURE

CROSS-REFERENCE TO RELATED APPLICATIONS

This application is a continuation of U.S. application Ser. No. 16/088,677, filed Sep. 26, 2018, entitled "MANAGING OR HANDLING OF UPLINK TRANSMISSIONS IN A COMMUNICATION NETWORK EMPLOYING A LISTEN-BEFORE-TALK PROCEDURE" which claims priority to International Application Number: PCT/IB 2017/051880, filed Mar. 31, 2017 entitled "MANAGING OR HANDLING OF UPLINK TRANSMISSIONS IN A COMMUNICATION NETWORK EMPLOYING A LISTEN-BEFORE-TALK PROCEDURE," which claims priority to U.S. Provisional Application No. 62/316,936, filed Apr. 1, 2016, entitled "APPARATUSES AND METHODS FOR MANAGING OR HANDLING OF UPLINK TRANSMISSIONS IN A COMMUNICATION NETWORK EMPLOYING A LISTEN-BEFORE-TALK PROCEDURE," the entireties of all of which are incorporated herein by reference.

TECHNICAL FIELD

The present embodiments relate to management or handling of uplink (UL) transmissions in a network employing a listen-before-talk (LBT) procedure and in particular to a method in a user equipment for using a gap within an UL subframe in a network employing a LBT procedure in unlicensed spectrum. The embodiments herein also relate to the user equipment, a method in a network node and the network node.

BACKGROUND

The third Generation Partnership Project (3GPP) initiative called "license assisted access" (LAA) has the purpose to allow long term evolution (LTE) devices such as a user equipment (UE) or a base station, such as an Evolved Node B (eNB) to also operate in the unlicensed 5 GHz radio spectrum. The unlicensed 5 GHz spectrum is used as a complement to the licensed spectrum. Accordingly, devices connect in the licensed spectrum using a primacy cell (PCell) and use carrier aggregation (CA) to benefit from additional transmission capacity in the unlicensed spectrum using one or more secondary cells (SCells). To reduce the changes required for aggregating the licensed and unlicensed spectrum, the LTE frame timing in the PCell is simultaneously used in the SCell. LAA may be viewed as the aggregation of LTE on licensed & unlicensed spectrums. It allows operators to boost network coverage by using, e.g., an unlicensed band, e.g., a 5 GHz band already populated by Wi-Fi or WLAN) devices—in ensuring application coverage.

The ongoing standalone LTE-U (LTE on unlicensed spectrum) forum and 3GPP Rel-14 work item on Uplink LAA intends to allow LTE UEs to transmit on the uplink in the unlicensed 5 GHz (or any other unlicensed band) or license-shared 3.5 GHz radio spectrum. For the case of standalone LTE-U, all downLink (DL) and UL transmissions take place entirely on the unlicensed spectrum.

Regulatory requirements, however, may not permit transmissions in the unlicensed spectrum without prior channel sensing. Since the unlicensed spectrum needs to be shared with other radios of similar or dissimilar wireless technologies, the so called Listen-Before-Talk (LBT) method/procedure needs to be applied. The LBT procedure involves sensing the medium for a pre-defined minimum amount of time and backing off if the channel is busy.

Wi-Fi, LAA and Standalone LTE-U may operate in multi-carrier mode with simultaneous transmission across multiple unlicensed channels in, e.g., the 5 GHz band. Wi-Fi follows a hierarchical multi-carrier LBT scheme across multiple carriers which are selected using specific channel bonding rules.

For LAA and Standalone LTE-U, UL transmissions are explicitly scheduled by the network node, e.g., an eNB which has full control over when UEs are allowed to transmit. However, for carriers operating in unlicensed spectrum, UEs need to perform some form of LBT before transmitting on the carrier. The form of LBT may depend on the number of UEs that are scheduled, the number of subframes that are scheduled in succession, the length of the previous transmissions on the carrier and other such factors. It is known that some parameters related to LBT can be signaled by the eNB to UEs so that they may perform LBT before transmission. However, the known signaling parameters do not fully encompass all the use cases and problems that will be encountered for UL transmissions in unlicensed spectrum.

In the following, a general description of the technologies involved in LAA are presented, which include LTE where the spectrum is licensed, and a system employing the LBT procedure, e.g., the WiFi or WLAN, in order to better understand the background of the embodiments herein.

LTE uses orthogonal frequency division multiplexing (OFDM) in the downlink and single-carrier FDMA (frequency division multiple access) in the uplink. The basic LTE downlink physical resource may be seen as a time-frequency grid as illustrated in FIG. 1, where each resource element corresponds to one OFDM subcarrier during one OFDM symbol interval. The uplink subframe has the same subcarrier spacing as the downlink and the same number of single carrier (SC)-FDMA symbols in the time domain as OFDM symbols in the downlink. The OFDM symbol is also shown including the cyclic prefix (CP) and an inter-subcarrier spacing of 15 kHz. A resource element is also indicated.

In the time domain, LTE downlink transmissions are organized into radio frames of 10 ms each radio frame consisting of ten equally-sized subframes of length Tsubframe=1 ms as shown in FIG. 2. For a normal (i.e. typical) CP, one subframe consists of 14 OFDM symbols. The duration of each symbol is approximately 71.4 μs.

Furthermore, the resource allocation in LTE is described in terms of resource blocks, where a resource block corresponds to one slot (e.g., 0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink UE transmissions are dynamically scheduled, i.e., in each subframe the base station or eNB transmits control information about which terminals (e.g. UEs) data is transmitted to and upon which radio downlink resource blocks the data is transmitted, in the current downlink subframe. This control signaling usually is transmitted in the first 1, 2, 3 or 4 OFDM symbols in each subframe and the number n=1, 2, 3 or 4 is known as the control format indicator (CFI). The downlink subframe also contains common reference symbols, which are known to the receiver and used for coherent demodulation of, e.g., the control information. A downlink system with CFI=3 OFDM symbols as control (control region) is illustrated in FIG. 3.

The reference symbols shown in FIG. 3 are known as cell specific reference symbols (CRSs) and are used to support multiple functions including fine time and frequency synchronization and channel estimation for certain transmission modes.

In LTE, there are channels known as the physical dedicated control channel (PDCCH) and the enhanced PDCCH (EPDCCH).

Both the PDCCH/EPDCCH are used to carry downlink control information (DCI) such as scheduling decisions and power-control commands. The DCI includes:

Downlink scheduling assignments, including Physical Downlink Shared Channel (PDSCH) resource indication, transport format, hybrid-ARQ information, and control information related to spatial multiplexing (if applicable). A downlink scheduling assignment also includes a command for power control of the Physical Uplink Control Channel (PUCCH) used for transmission of hybrid-automatic repeat request (ARQ) acknowledgements in response to downlink scheduling assignments.

Uplink scheduling grants including a physical uplink shared channel (PUSCH) resource indication, a transport format, and hybrid-ARQ-related information. An uplink scheduling grant also includes a command for power control of the PUSCH.

Power-control commands for a set of terminals (UEs) as a complement to the commands included in the scheduling assignments/grants.

A PDCCH/EPDCCH carries one DCI message containing one of the groups of information listed above. As multiple terminals (UEs) can be scheduled simultaneously, and each terminal can be scheduled on both downlink and uplink simultaneously, it is possible to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio channel conditions, link adaptation can be used, where the code rate of the PDCCH/EPDCCH is selected by adapting the resource usage for the PDCCH/EPDCCH, to match the radio-channel conditions.

LTE standard supports bandwidths larger than 20 MHz. One important requirement on LTE Rel-10 is to assure backward compatibility with LTE Release 8 (RL-8). This should also include spectrum compatibility. That would imply that an LTE Rel-10 carrier, wider than 20 MHz, should appear as a number of LTE carriers to an LTE Rel-8 terminal. Each such carrier can be referred to as a component carrier (CC). In particular, for early LTE Rel-10 deployments, it can be expected that there will be a smaller number of LTE Rel-10-capable terminals compared to many LTE legacy terminals.

Therefore, it is necessary to assure an efficient use of a wide carrier also for legacy terminals, i.e., that it is possible to implement carriers where legacy terminals (Rel 8 terminals) can be scheduled in all parts of the wideband LTE Rel-10 carrier. The straightforward way to obtain this would be by means of carrier aggregation (CA). CA implies that an LTE Rel-10 terminal can receive multiple component carriers (CCs), where the CC have, or at least the possibility to have, the same structure as a Rel-8 carrier. CA is illustrated in FIG. 4. A CA-capable UE is assigned a primary cell (PCell) which is always activated, and one or more secondary cells (SCells), which may be activated or deactivated dynamically.

The number of aggregated component carrier (CCs as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal. A terminal (e.g. UE) may, for example, support more downlink CCs than uplink CCs, even though the cell is configured with the same number of uplink and downlink CCs.

In addition, a feature of carrier aggregation is the ability to perform cross-carrier scheduling. This mechanism allows a (E)PDCCH on one CC to schedule data transmissions on another CC by means of a 3-bit carrier indicator field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically.

As previously described, in LAA systems a sharing of spectrum is performed wherein LTE operates at a licensed spectrum and WLAN or Wi-Fi operates at an unlicensed spectrum. In the following, the WLAN or Wi-Fi system is briefly described and particularly how the channel is accessed in WLAN systems.

In typical deployments of WLAN, carrier sense multiple access with collision avoidance (CSMA/CA) is used for medium access. This means that the channel is sensed to perform a CCA, and a transmission is initiated only if the channel is declared as Idle. In the case where the channel is declared as Busy, the transmission is essentially deferred until the channel is deemed to be Idle. When the range of several access points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the LBT mechanism or procedure is shown in FIG. 5.

After a WLAN station A transmits a data frame to a station B, station B shall transmit the ACK (i.e. acknowledgement) frame back to station A with a delay of 16 μs. Such an ACK frame is transmitted by station B without performing a LBT operation. To prevent another station interfering with such an ACK frame transmission, a station shall defer for a duration of 34 μs (referred to as DIFS (i.e. distributed inter-frame space)) after the channel is observed to be occupied before assessing again whether the channel is occupied.

Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

To further prevent a station from occupying the channel continuously and thereby prevent other stations from accessing the channel, it is required for a station wishing to transmit again after a transmission is completed to perform a random backoff.

The PIFS (i.e. point coordination function (PCF) interframe space) is used to gain priority access to the medium, and is shorter than the DIFS duration. Among other cases, it can be used by stations operating under PCF, to transmit beacon frames with priority. At the nominal beginning of each Contention-Free Period (CFP), the AP shall sense the medium. When the medium is determined to be idle for one PIFS period (generally 25 µs), the AP shall transmit a beacon frame containing the CF parameter set element and a delivery traffic indication message element.

For multi-carrier operation, Wi-Fi follows a hierarchical channel bonding scheme to determine its transmission bandwidth for a frame, which could be 20 MHz, 40 MHz, 80 MHz, or 160 MHz for example. In the 5 GHz band, wider Wi-Fi channel widths of 40 MHz, 80 MHz, 160 MHz or 80+80 MHz are formed by combining 20 MHz sub-channels in a non-overlapping manner. A pre-determined primary channel performs the CW (i.e. contention window)-based random access procedure after a defer period if necessary, and then counts down the random number generated. The secondary channels only perform a quick CCA check for a PIFS duration (generally 25 µs) before the potential start of transmission to determine if the additional secondary channels are available for transmission. Based on the results of the secondary CCA check, transmission is performed on the larger bandwidths; otherwise transmission falls back to smaller bandwidths. The Wi-Fi primary channel is always included in all transmissions, i.e., transmission on secondary channels alone is not allowed.

Regarding LAA systems, up to now, the spectrum used by LTE is dedicated to LTE. This has the advantage that an LTE system does not need to care about coexistence with other non-3GPP radio access technologies in the same spectrum and spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum.

With LAA to an unlicensed spectrum, as shown in FIG. 6, a UE is connected to a PCell operating in the licensed spectrum and one or more SCells operating in the unlicensed spectrum. In this disclosure, we denote a SCell in an unlicensed spectrum as LAA secondary cell (LAA SCell). The LAA SCell may operate in DL-only mode or operate with both UL and DL traffic. Furthermore, in future scenarios, the LTE nodes may operate in standalone mode in license-exempt channels without assistance from a licensed cell. An unlicensed spectrum may, by definition, be simultaneously used by multiple different technologies. Therefore, LAA as described above may coexist with other systems such as IEEE 802.11 (Wi-Fi or WLAN).

To coexist in a fair manner with a Wi-Fi system, transmission on the SCell shall conform to LBT protocols in order to avoid collisions and causing severe interference to on-going transmissions. This includes both performing LBT before commencing transmissions, and limiting the maximum duration of a single transmission burst. The maximum transmission burst duration is specified by country and region-specific regulations, for example, 4 ms in Japan. An example in the context of LAA is shown in FIG. 7, showing LAA to an unlicensed spectrum using LTE carrier aggregation and LBT to ensure good coexistence with other unlicensed band technologies.

FIG. 7 also shows different examples for the duration of a transmission burst on the LAA SCell constrained by a maximum allowed transmission duration of 4 ms (one subframe is 1 ms long). Before the eNB transmits data in the DL, the eNB performs LBT to gain channel access. During the eNB's transmission duration, the eNB also sends out control channels to schedule certain UEs to transmit in the UL at specific time later. After the eNB releases the channel, the scheduled UEs perform LBT to determine whether they can transmit in the channel at the specific time.

When an eNB obtains an opportunity to transmit in unlicensed spectrum, this opportunity, also commonly referred to as a TXOP (transmit opportunity) may be shared with UEs that the eNB is serving. Transitions between transmissions from the eNB to transmissions from UEs may be handled in two ways, one where the UEs perform an LBT operation prior to transmission and one where the UEs do not perform an LBT operation. The case where an LBT operation is not performed will most likely need the gap between downlink transmissions (from the eNB) and uplink transmissions (from the UE(s)) to be no more than 16 µs. When LBT is to be performed, two broad categories of LBT operations may be used in general. In the first type, an LBT procedure with full random backoff similar to what is used by IEEE 802.11 compliant nodes may be used. These schemes are also referred to as Category 4 LBT schemes. In the second type, a UE may perform an LBT operation for a fixed duration, e.g., 25 µs. Generally, the second type of LBT is preferable for transitions between DL (downlink) and UL (uplink) transmissions since it minimizes the probability of some other node(s) completing its LBT operations and commencing transmissions on the channel.

A known technique to minimize gaps between DL and UL transmissions is the use of a timing advance command to advance the timing of the UEs transmissions on the UL so that they occur earlier. This technique has been envisioned for use where the eNB may employ transmissions only over a part of the subframe in the last DL subframe of a transmission burst. In this case, there is some gap within the DL subframe that can be occupied by UL transmissions by UEs that have received timing advance (TA) commands.

The known signaling methods and parameters do not fully encompass all the use cases and problems that will be encountered for UL transmissions in an unlicensed spectrum. The techniques to use a TA command to minimize the gaps between DL and UL transmissions do not work well when eNBs do not use partial transmission time intervals within subframes (also sometimes referred to as starting or ending partial subframes).

The known signaling methods do not allow an eNB to handoff its transmission opportunity to a UE while minimizing the gap between DL and UL transmissions thus increasing the probability that some other node takes control of the channel. This can lead to inefficiency in the operation of LTE in unlicensed spectrum which is not beneficial for the system and also for other coexisting systems. The current signaling methods also do not provide full flexibility to the eNB in managing the LBT parameters used by the UE which reduces the options at the eNBs disposal to ensure good performance of LTE in unlicensed spectrum.

SUMMARY

To solve the above mentioned problems, some embodiments herein address how the UL transmissions by UEs can be managed. New signaling methods are described to solve these problems and address the new use cases.

An object according to some embodiments herein is to provide a method and an arrangement in a user equipment for managing or handling uplink transmissions in a network employing LBT procedure.

Thus, according to an aspect of some exemplary embodiments, there is provided a method performed by a user equipment (UE); the method comprising: obtaining a timing advance (TA) command or value from a network node; obtaining information or an indication on a location of a gap within an uplink (UL) subframe informing or indicating to the UE, when an UL transmission is to be performed, wherein the occurrence/location of the gap occurs after the duration of the TA command or value; and performing an UL transmission of the UL subframe after the duration of the gap or subsequent to the gap.

According to another aspect of some exemplary embodiments, there is provided a UE or an arrangement in the UE for managing or handling uplink transmissions in a network employing LBT procedure. The UE comprising a processor and a memory, said memory containing instructions executable by said processor whereby said UE is operative to: obtain a timing advance (TA) command or value from a network node; obtain information or an indication on a location of a gap within an UL subframe informing or indicating to the UE when an UL transmission is to be performed, wherein the occurrence/location of the gap occurs after the duration of the TA command or value; and performing the UL transmission of the UL subframe after the duration of the gap or subsequent to the gap.

According to another aspect of some exemplary embodiments, there is provided a network node or an arrangement in the network node for managing or handling uplink transmissions of a user equipment in a network employing LBT procedure. The network node comprising a processor and a memory, said memory containing instructions executable by said processor whereby said network node is operative to: provide the UE with a timing advance (TA) command or value; provide the UE with information or an indication on a location of a gap within an UL subframe, the information or the indication informing or indicating to the UE when an UL transmission is to be performed, wherein the occurrence/location of the gap occurs after the duration of the TA command or value; and receive the UL subframe from the UE after the duration of the gap.

According to another aspect of some exemplary embodiments, there is provided a method performed by a network node; the method comprising: providing a UE with a timing advance (TA) command or value; providing the UE with information or an indication on a location of a gap within an UL subframe informing or indicating to the UE when an UL transmission is to be performed, wherein the occurrence/location of the gap occurs after the duration of the TA command or value; and receiving the UL subframe from the UE after the duration of the gap.

An advantage achieved by some of the disclosed embodiments is higher UL users and a better system performance.

Another advantage herein (i.e. of some of the embodiments disclosed herein) is to increase the probability that concurrently scheduled UEs access an unlicensed spectrum simultaneously in an efficient manner to achieve the gains due to multi-user multiplexing. In other words, the network node or eNB, according to embodiments herein, provides techniques to at least mitigate the interference caused by its own UEs to themselves. Since the network node or eNB is in control of all transmissions by the UEs, the eNB herein further controls the channel access parameters when it is beneficial, such that the chance that all scheduled UEs for a scheduling unit may access the channel simultaneously would increase. In other words, by controlling the channel access parameters the network node or eNB is capable of avoiding situations where one of the concurrently scheduled UEs has failed to access to the channel due to transmission by another UE which is scheduled by the same network node eNB for the same subframe.

According to another aspect of the disclosure, a method for a communication device is provided. The method comprises obtaining a timing advance value, the timing advance value indicating a time period in which the communication device shall advance a first uplink subframe transmission to the network node, obtaining information about a location of a gap within the first uplink subframe, the gap having a predefined duration, the location of the gap occurring after the time period indicated in the timing advance value, and performing the first uplink subframe transmission after the predefined duration.

According to an embodiment of this aspect, the location of a gap in a second uplink subframe is different than the location of the gap in the first uplink subframe. According to another embodiment, the method further performing a listen-before-talk (LBT) procedure either during the predefined duration of the gap or after the predefined duration of the gap. According to another embodiment, the method further comprises receiving, from the network node, a notification indicating at least one of the predefined duration of the gap, the location of the gap within the first uplink subframe, and whether the LBT procedure is to be performed.

According to another embodiment, the method further comprises receiving, from the network node, a notification indicating that the gap should be delayed by a timeframe equal to the time period in the timing advance value relative to a start of the first uplink subframe. According to another embodiment, the notification from the network node indicating at least one of the predefined duration of the gap, the location of the gap within the first uplink subframe, and whether the LBT procedure is to be performed is transmitted using a physical dedicated control channel (PDCCH) downlink control indicator (DCI). According to another embodiment, the notification from the network node indicating at least one of the predefined duration of the gap, the location of the gap within the first uplink subframe, and whether the LBT procedure is to be performed, is provided in an uplink grant.

According to another embodiment, the method further comprises receiving a notification from the network node indicating that the gap should occur at one of a beginning of the first uplink subframe, a location within the first uplink subframe that is a function of the time period indicated by the timing advance value, and at an end of a first orthogonal frequency division multiplexing (OFDM) symbol in the first uplink subframe. According to another embodiment, the method further comprises receiving a notification from the network node indicating whether the location of the gap is fixed or variable.

According to another embodiment, the method further comprises determining that the gap in the first uplink subframe occurred after the time period indicated in the timing advance value, establishing another gap at the start of the second uplink subframe, and implementing the other gap at the start of a second uplink subframe. According to another embodiment, the method further comprises receiving a notification from the network node indicating whether the network node is employing partial transmission time intervals (TTIs) within a downlink subframe immediately preceding the first uplink subframe and determining whether the downlink subframe is partial based on the received notification. If it is determined that the downlink subframe is partial, the method further comprises maintaining the location of the gap within the first uplink subframe. If it is determined that the downlink subframe is not partial, the method further comprises determining if the first uplink subframe occurs after the downlink subframe, and moving the location of the gap based on the time period in the timing advance value if the first uplink subframe occurs after the downlink subframe.

According to another embodiment, the location of the gap is in a first discrete-Fourier-transform spread-orthogonal frequency division multiplexing (DFTS-OFDM) symbol of the first uplink subframe and a location of a second gap is in a last DFTS-OFDM symbol of the first uplink subframe, wherein the predefined duration of the gap and the predefined duration of the second gap are different. According to another embodiment, implementing the location of the second gap in the last DFTS-OFDM symbol of the first uplink subframe is based on a type of listen-before-talk (LBT) procedure indicated for the communication device in a second uplink subframe.

According to another aspect of the disclosure, a communication device configured to manage uplink transmissions is provided. The communication device comprises a communication interface, and processing circuitry including a memory and a processor, the memory in communication with the processor, the memory having instructions that, when executed by the processor, configure the processor to obtain a timing advance value, the timing advance value indicating a time period in which the communication device shall advance a first uplink subframe transmission to a network node, obtain information about a location of a gap within the first uplink subframe, the gap having a predefined duration, the location of the gap occurring after the time period indicated in the timing advance value, and configure the communication interface to perform the first uplink subframe transmission after the predefined duration.

According to an embodiment of this aspect, the location of a gap in a second uplink subframe is different than the location of the gap in the first uplink subframe. According to another embodiment, the processor is further configured to perform a listen-before-talk (LBT) procedure either during the predefined duration of the gap or after the predefined duration of the gap. According to another embodiment, the communication interface is further configured to receive, from the network node, a notification indicating at least one of the predefined duration of the gap, the location of the gap within the first uplink subframe, and whether the LBT procedure is to be performed.

According to another embodiment, the communication interface is further configured to receive, from the network node, a notification indicating that the gap should be delayed by a timeframe equal to the time period in the timing advance value relative to a start of the first uplink subframe. According to another embodiment, the notification from the network node indicating at least one of the predefined duration of the gap, the location of the gap within the first uplink subframe, and whether the LBT procedure is to be performed is transmitted using a physical dedicated control channel (PDCCH) downlink control indicator (DCI). According to another embodiment, the notification from the network node indicating at least one of the predefined duration of the gap, the location of the gap within the first uplink subframe, and whether the LBT procedure is to be performed, is provided in an uplink grant.

According to another embodiment, the communication interface further comprises receiving a notification from the network node indicating that the gap should occur at one of a beginning of the first uplink subframe, a location within the first uplink subframe that is a function of the time period indicated by the timing advance value, and at an end of a first orthogonal frequency division multiplexing (OFDM) symbol in the first uplink subframe. According to another embodiment, the communication interface is further configured to receive a notification from the network node indicating whether the location of the gap is fixed or variable.

According to another embodiment, the processor is further configured to determine that the gap in the first uplink subframe occurred after the time period indicated in the timing advance value, establishing another gap at the start of the second uplink subframe, and implement another gap at the start of a second uplink subframe. According to another embodiment, the communication interface is further configured to receive a notification from the network node indicating if the network node is employing partial transmission time intervals (TTIs) within a downlink subframe immediately preceding the first uplink subframe, the processor further configured to determine whether the downlink subframe is partial based on the received notification. If it is determined that the downlink subframe is partial, the processor is further configured to maintain the location of the gap within the first uplink subframe. If it is determined that the downlink subframe is not partial, the processor is further configured to determine if the first uplink subframe occurs after the downlink subframe, and move the location of the gap based on the time period in the timing advance value if the first uplink subframe occurs after the downlink subframe.

According to another embodiment, the location of the gap is in a first discrete-Fourier-transform spread-orthogonal frequency division multiplexing (DFTS-OFDM) symbol of the first uplink subframe and a location of a second gap is in a last DFTS-OFDM symbol of the first uplink subframe, wherein the predefined duration of the gap and the predefined duration of the second gap are different. According to another embodiment, implementing the location of the second gap in the last DFTS-OFDM symbol of the first uplink subframe is based on a type of listen-before-talk (LBT) procedure indicated for the communication device in a second uplink subframe.

According to another aspect of the disclosure, a method in a network node for managing uplink transmissions with a communication device is provided. The method comprises determining a timing advance value, the timing advance value indicating a time period in which a communication device shall advance a first uplink subframe transmission to the network node, determining information about a location of a gap within the first uplink subframe, the gap having a predefined duration, the location of the gap occurring after the time period indicated in the timing advance value, transmitting, to the communication device, the timing advance value and the information about the location in the gap within the first uplink subframe, and receiving, from the communication device, the first uplink subframe transmission after the predefined duration.

According to an embodiment of this aspect, the location of a gap in a second uplink subframe is different than the location of the gap in the first uplink subframe. According to another embodiment, the method further comprises transmitting, to the communication device, a notification indicating at least one of the predefined duration of the gap, the location of the gap within the first uplink subframe, and whether a listen-before-talk (LBT) procedure is to be performed. According to another embodiment, the method further comprises transmitting, to the communication device, a notification indicating that the gap should be delayed by a timeframe equal to the time period in the timing advance value relative to a start of the first uplink subframe. According to another embodiment, the notification to the communication device indicates at least one of the predefined duration of the gap, the location of the gap within the first uplink subframe, and whether the LBT procedure is to be performed is transmitted using a physical dedicated control channel (PDCCH) downlink control indicator (DCI). According to another embodiment, the notification to the communication device indicates at least one of the predefined duration of the gap, the location of the gap within the first uplink subframe, and whether the LBT procedure is to be performed, is provided in an uplink grant.

According to another embodiment, the method further comprises transmitting, to the communication device, a notification indicating that the gap should occur at one of a beginning of the first uplink subframe, a location within the first uplink subframe that is a function of the time period indicated by the timing advance value, and at an end of a first orthogonal frequency division multiplexing (OFDM) symbol in the first uplink subframe. According to another embodiment, the method further comprises transmitting, to the communication device, a notification indicating whether the location of the gap is fixed or variable. According to another embodiment, the method further comprises transmitting, to the communication device, a notification indicating if the network node is employing partial transmission time intervals (TTIs) within a downlink subframe immediately preceding the first uplink subframe.

According to another aspect of the disclosure, a network node configured to manage uplink transmissions is provided. The network node comprises processing circuitry including a memory and a processor, the memory in communication with the processor, the memory having instructions that, when executed by the processor, configure the processor to determine a timing advance value, the timing advance value indicating a time period in which a communication device shall advance a first uplink subframe transmission to a network node, and determine information about a location of a gap within the first uplink subframe, the gap having a predefined duration, the location of the gap occurring after the time period indicated in the timing advance value. The network node further comprises a communication interface configured to transmit, to the communication device, the timing advance value and the information about the location in the gap within the first uplink subframe, and receive, from the communication device, the first uplink subframe transmission after the predefined duration.

According to an embodiment of this aspect, the location of a gap in a second uplink subframe is different than the location of the gap in the first uplink subframe. According to another embodiment, the processor configures the communication interface to transmit, to the communication device, a notification indicating at least one of the predefined duration of the gap, the location of the gap within the first uplink subframe, and whether a listen-before-talk (LBT) procedure is to be performed.

According to another embodiment, the processor configures the communication interface to transmit, to the communication device, a notification indicating that the gap should be delayed by a timeframe equal to the time period in the timing advance value relative to a start of the first uplink subframe. According to another embodiment, the notification to the communication device indicating at least one of the predefined duration of the gap, the location of the gap within the first uplink subframe, and whether the LBT procedure is to be performed is transmitted using a physical dedicated control channel (PDCCH) downlink control indicator (DCI).

According to another embodiment, the notification to the communication device indicating at least one of the predefined duration of the gap, the location of the gap within the first uplink subframe, and whether the LBT procedure is to be performed, is provided in an uplink grant. According to another embodiment, the processor configures the communication interface to transmit, to the communication device, a notification indicating that the gap should occur at one of a beginning of the first uplink subframe, a location within the first uplink subframe that is a function of the time period indicated by the timing advance value, and at an end of a first orthogonal frequency division multiplexing (OFDM) symbol in the first uplink subframe. According to another embodiment, the processor configures the communication interface to transmit, to the communication device, a notification indicating whether the location of the gap is fixed or variable. According to another embodiment, the processor configures the communication interface to transmit, to the communication device, a notification indicating if the network node is employing partial transmission time intervals (TTIs) within a downlink subframe immediately preceding the first uplink subframe.

According to another aspect of the disclosure, a communication device configured to manage uplink transmissions, is provided. The communication device comprises a communication interface module and an uplink subframe transmission module configured to obtain a timing advance value, the timing advance value indicating a time period in which the communication device shall advance a first uplink subframe transmission to a network node, obtain information about a location of a gap within the first uplink subframe, the gap having a predefined duration, the location of the gap occurring after the time period indicated in the timing advance value, and configure the communication interface module to perform the first uplink subframe transmission after the predefined duration.

According to another aspect of the disclosure, network node configured to manage uplink transmissions, is provided. The network node comprises a timing advance and gap generation module configured to determine a timing advance value, the timing advance value indicating a time period in which a communication device shall advance a first uplink subframe transmission to a network node, and determine information about a location of a gap within the first uplink subframe, the gap having a predefined duration, the location of the gap occurring after the time period indicated in the timing advance value. The network node further comprises a communication interface module configured to transmit, to the communication device, the timing advance value and the information about the location in the gap within the first uplink subframe, and receive, from the communication device, the first uplink subframe transmission after the predefined duration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

The disclosed embodiments herein disclose signaling methods in order to address the aforementioned problems and address new use cases. In addition, some embodiments describe how some signaling parameters can be used to increase efficiency of LTE in an unlicensed spectrum.

In the present disclosure the terms UE and eNB are used throughout many disclosed embodiments. However, the terms "communication device" and "network node", respectively, could also be used, instead, in context that would be understood as a person skilled in the art as also applicable.

Briefly described, exemplifying embodiments of a user equipment (UE) and a method therein is provided for managing or handling uplink (UL) transmission based on the provision of the timing advance (TA) command or a TA value provided by a network node, e.g., a eNB, and also based on a location of a gap in a scheduled UL subframe. The UE and the network node operating in a network employing a Listen-Before-Talk (LBT) procedure or method to access a communication channel for transmission and/or reception of DL and/or UL subframes. Exemplifying embodiments herein also include a method in the network node, the network node, and the UE.

Figure 8:
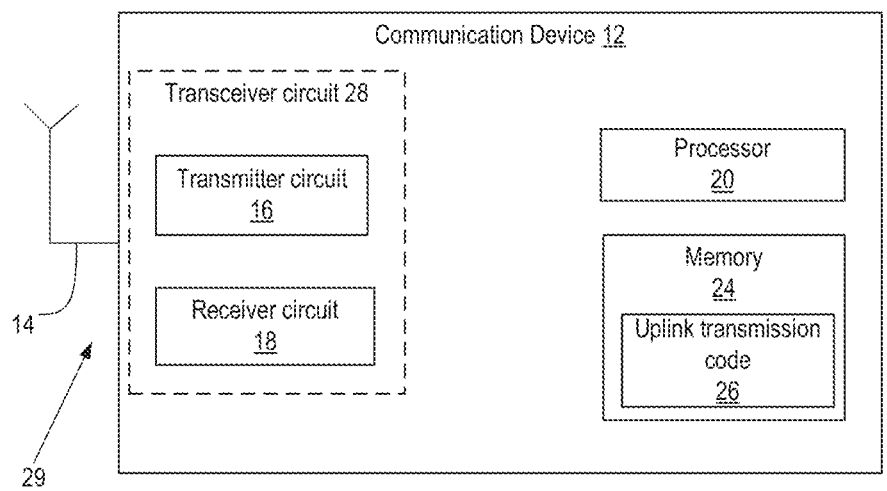
FIG. 8 is a block diagram illustrating a UE user equipment configured to perform the methods described herein according to embodiments of the present disclosure.

Referring to FIG. 8, there is illustrated a block diagram of exemplary components of a communication device (e.g., UE) 12 in accordance with embodiments disclosed herein. Communication device 12 comprises at least one antenna 14, a transmitter module or t circuit 16, a receiver module or circuit 18, and processing circuitry or processing module or processor 20 a memory 24. Memory 24 may store uplink transmission code 26. As shown in FIG. 8, the transmitter circuit 16 and the receiver circuit 18 may, optionally, be included in a transceiver circuit 28. The combination of antenna 14, transmitter circuit 16, receiver circuit 18, and, optionally, transceiver circuit 28, is referred to herein as communication interface 29.

Processing circuitry (or processor) 20 may comprise integrated circuitry for processing and/or control, e.g., one or more processors and/or processor cores and/or FPGAs (Field Programmable Gate Array) and/or ASICs (Application Specific Integrated Circuitry). Processor 20, which controls the operation of UE 12, may be configured to access (e.g., write to and/or read from) memory 24, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 20 and/or other data, e.g., data pertaining to communication, e.g., configuration and/or address data of nodes, etc. Memory 24 has instructions that, when executed by processor 20, configures processor 20 to perform the processes described herein. Communication device 12 may include additional components not shown in FIG. 8.

Figure 9:
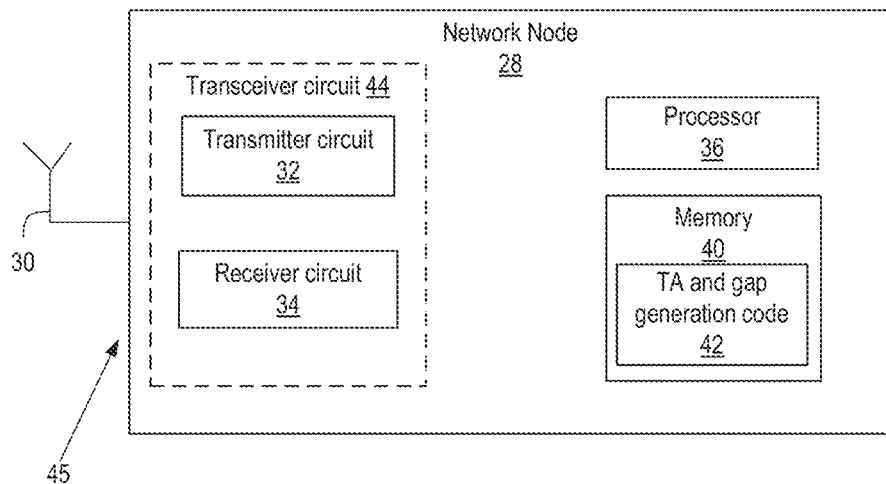
FIG. 9 is a block diagram illustrating a network node configured to perform the methods described herein according to embodiments of the present disclosure.

Antenna 14 comprises one or more antennas to transmit and/or receive radio frequency (RF) signals. Antenna 14 may, for example, receive RF signals from transmitter circuit 16, receiver circuit 18 and/or transceiver circuit 24 and transmit the RF signals to one or more other communication devices, e.g., UEs, 12 or network nodes 28 (as shown in FIG. 9), and receive RF signals from the other communication devices and provide the received RF signals to receiver circuit 18 and/or transceiver circuit 24.

Figure 10:
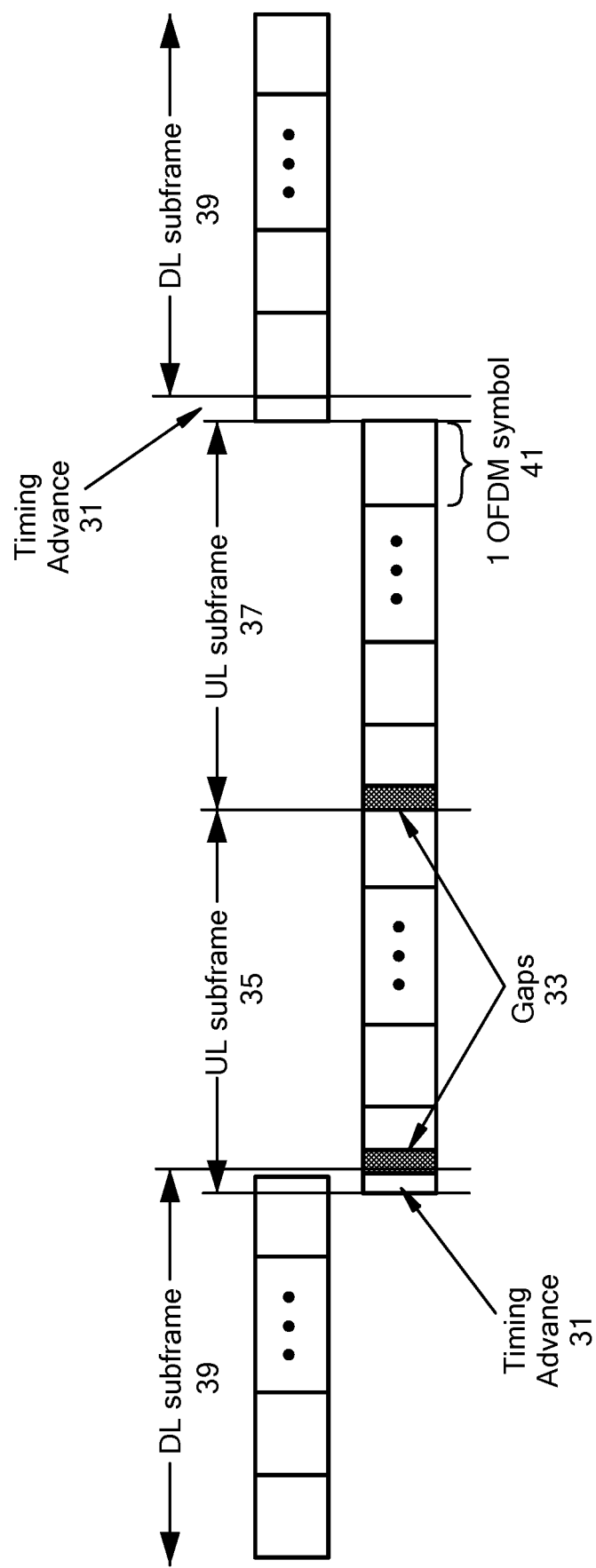
FIG. 10 depicts a variation of the location of the gap between UL transmissions by successive UEUE's within a UL subframe when network node(s) or eNB(s) do not employ partial TTIs within DL subframes according to exemplary embodiments disclosed herein.

Communication device 12 is configured to obtain a timing advance (TA) 31 (as shown in FIG. 10) command or value from a network node 28. Communication device 12 is further configured to obtain (implicitly or explicitly via signaling from a network node 28) information or an indication on a location of a gap 33 (as shown in FIG. 10) within a first UL subframe 35 (as shown in FIG. 10) informing or indicating to Communication device 12 when an UL transmission is to be performed, wherein the occurrence/location of the gap 33 occurs after the duration of the TA 31 command or value. Communication device 12 is configured to perform the UL transmission of the first UL subframe 35 after the duration of the gap 33 or subsequent to the gap 33.

Memory 24 may contain instructions executable by the processor 20, which configures communication interface 29 to receive a TA 31 command or value from network node 28, to obtain information or an indication on a location of a gap 33 within a first UL subframe 35 informing or indicating to UE 12 when an UL transmission is to be performed, wherein the occurrence/location of the gap 33 occurs after the duration of the TA 31 command or value, and to perform the UL transmission of the first UL subframe 35 after the duration of the gap 33 or subsequent to the gap 33.

Computer readable code may also be provided in memory 24 and is executed by processor 20, which causes UE 12 to perform any of the embodiments described herein relating to the operation of UE 12.

FIG. 9 illustrates a block diagram of exemplary components of a network node 28 in accordance with embodiments disclosed herein. Network node 28 comprises at least one antenna 30, a transmitter circuit 32, a receiver circuit 34, processing circuitry or processing module or processor 36, and a memory 40. Processor 36 controls the operation of network node 28 and its components. Memory 40 may store TA and uplink code 42. As shown in FIG. 9, the transmitter circuit 32 and the receiver circuit 34 may, optionally, be included in a transceiver circuit 44. The combination of antenna 30, transmitter circuit 32, receiver circuit 34 and, optionally, transceiver circuit 44, is referred herein to as communication interface 45.

Processing circuitry or processor 36 may comprise integrated circuitry for processing and/or control, e.g., one or more processors and/or processor cores and/or FPGAs (Field Programmable Gate Array) and/or ASICs (Application Specific Integrated Circuitry). Processor 36, which controls the operation of network node 28, may be configured to access (e.g., write to and/or read from) memory 40, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 40 may be configured to store code executable by processor 36 and/or other data, e.g., data pertaining to communication, e.g., configuration and/or address data of nodes, etc. Memory 40 has instructions that, when executed by processor 36, configures processor 36 to perform the processes described herein. Network node 28 may include additional components not shown in FIG. 9.

Antenna 30 comprises one or more antennas to transmit and/or receive radio frequency (RF) signals. Antenna 30 may, for example, receive RF signals from transceiver circuit 32, receiver circuit 34, and/or transceiver circuit 44 and transmit the RF signals to one or more other communication devices, e.g., UEs 12 or network nodes 28, and receive RF signals from UEs 12 or other network nodes 28 and provide the RF signals to receiver circuit 34 and/or transceiver circuit 44.

Processor 36 of network node 28 may configure communication interface 45 to provide UE 12 with a TA 31 command or value via a signal or notification to the UE 12, provide UE 12 with information or an indication on a location of a gap 33 within a first UL subframe 35, the information or the indication informing or indicating to UE 12 when an UL transmission is to be performed, wherein the occurrence/location of the gap 33 occurs after the duration of the TA 31 command or value, and to receive the first UL subframe 35 from UE 12 after the duration of the gap 33.

Memory 40 may contain instructions executable by processor 36 whereby network node 28 is configured to provide UE 12, via a signal or notification, with a TA 31 command or value; provide, via signaling, UE 12 with information or an indication on a location of a gap 33 within the first UL subframe 35, the information or the indication informing or indicating to UE 12 when an UL transmission is to be performed, wherein the occurrence/location of the gap 33 occurs after the duration of the TA 31 command or value, and to receive the first UL subframe 35 from UE 12 after the duration of the gap 33.

A computer readable code stored in memory 40 and executed by processor 36 is also provided which when run in network node 28 causes network node 28 to perform anyone of the embodiments disclosed herein relating to the operation of network node 28.

Referring to FIG. 10, there is shown an exemplary embodiment illustrating the location of a gap 33 and a TA 31 in scheduled first UL subframe 35 and a second UL subframe 37 for different UEs 12, in accordance with embodiments herein.

Figure 1:
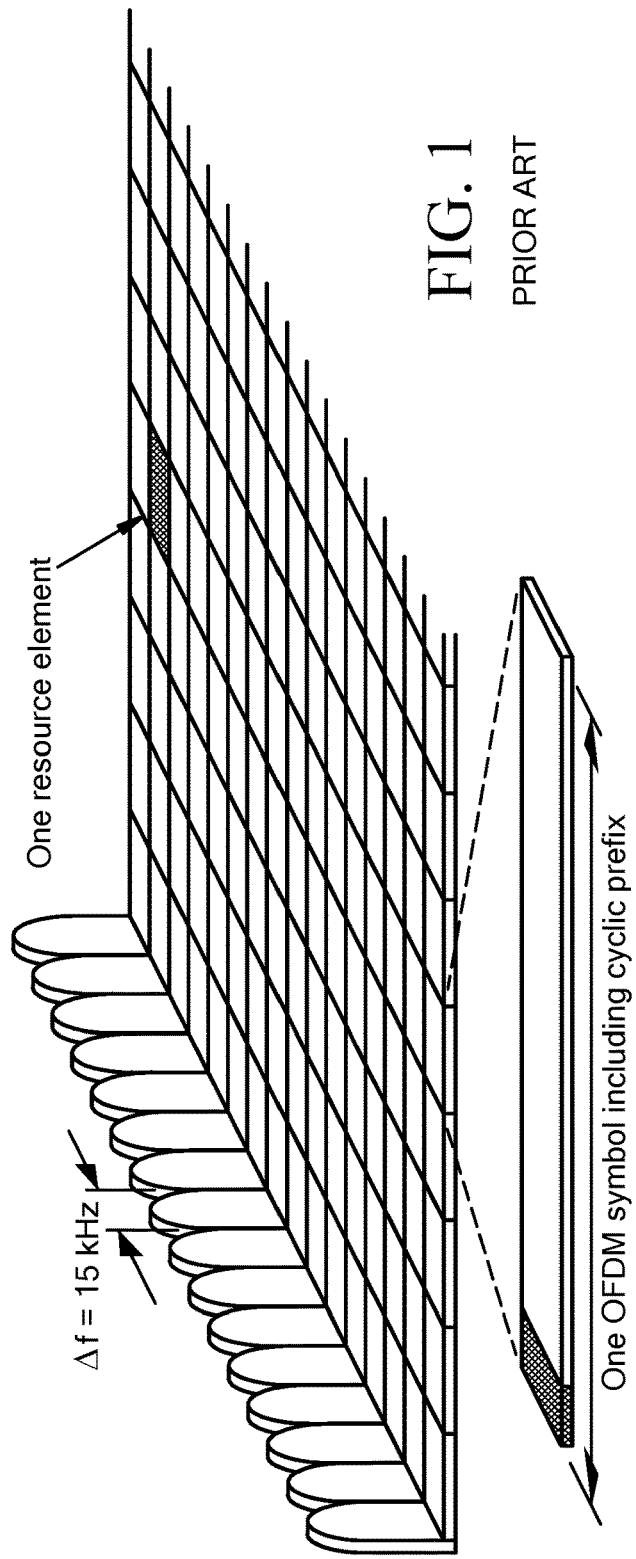
FIG. 1 is a diagram illustrating a known LTE downlink Physical resource.
Figure 2:
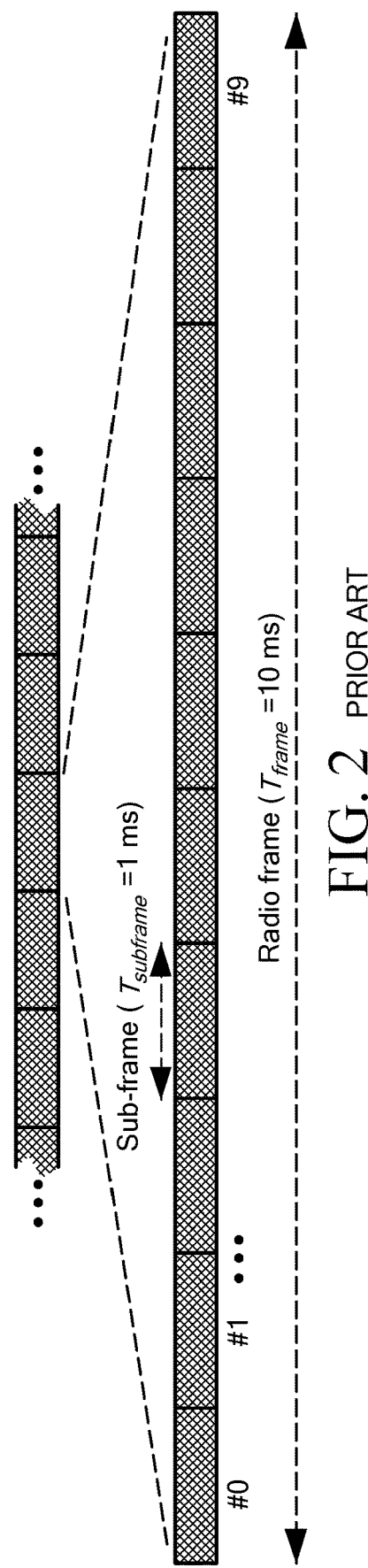
FIG. 2 is a diagram illustrating a known LTE time-domain structure.
Figure 3:
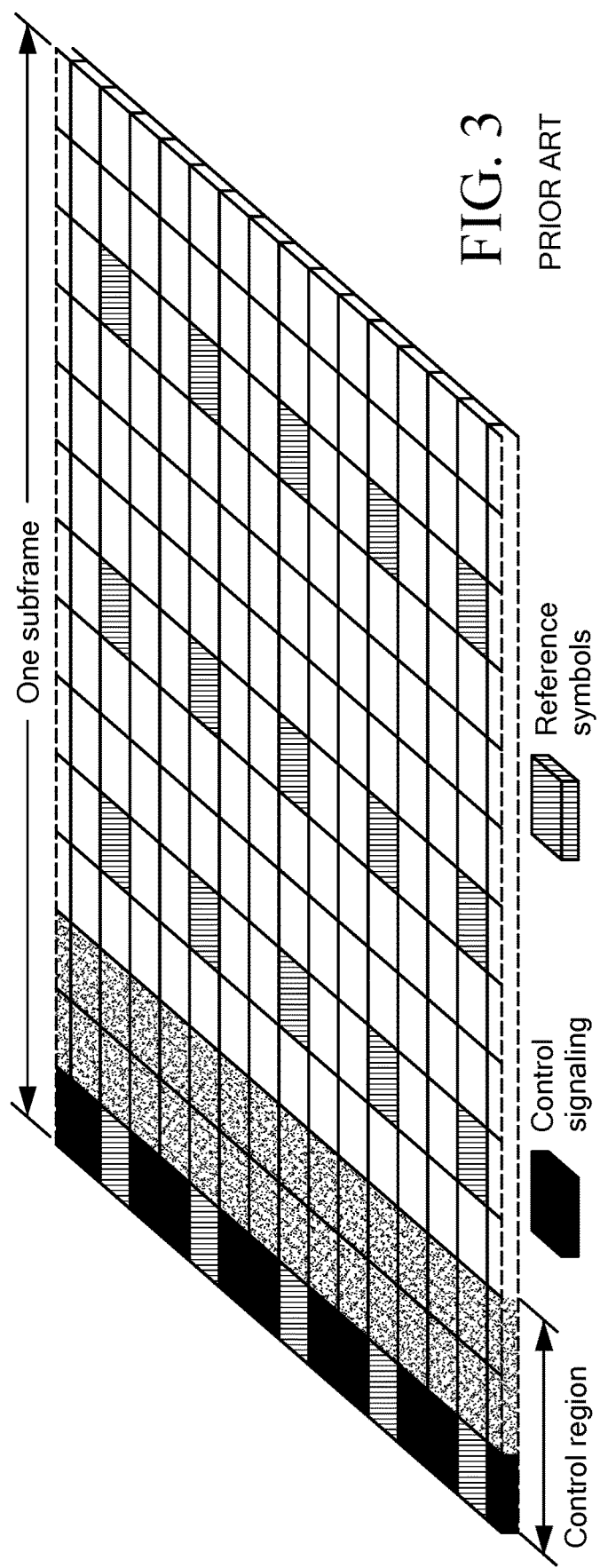
FIG. 3 illustrates a simplified diagram of a downlink subframe in LTE.
Figure 4:
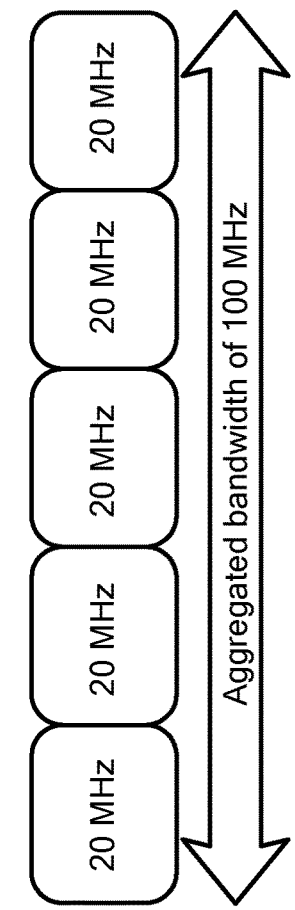
FIG. 4 illustrates an example of carrier aggregation in LTE.
Figure 5:
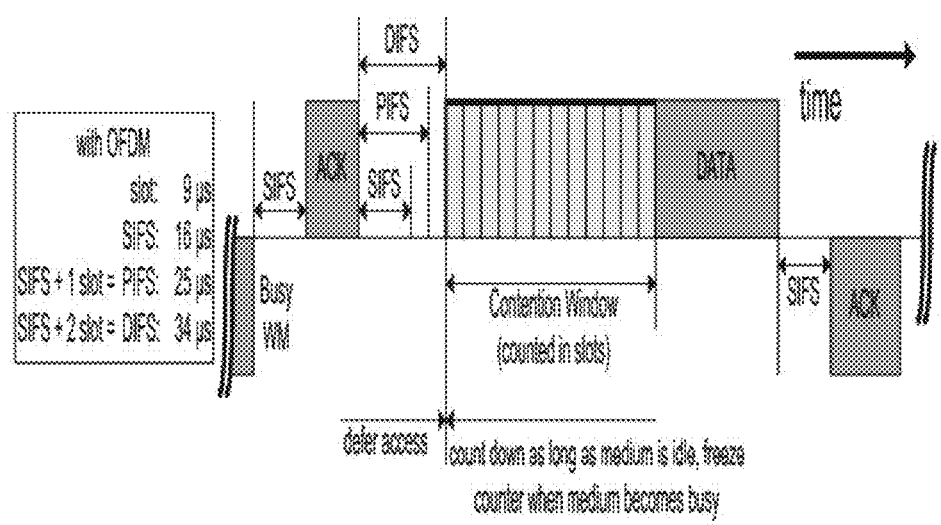
FIG. 5 illustrates a LBT procedure in a WiFi system.
Figure 6:
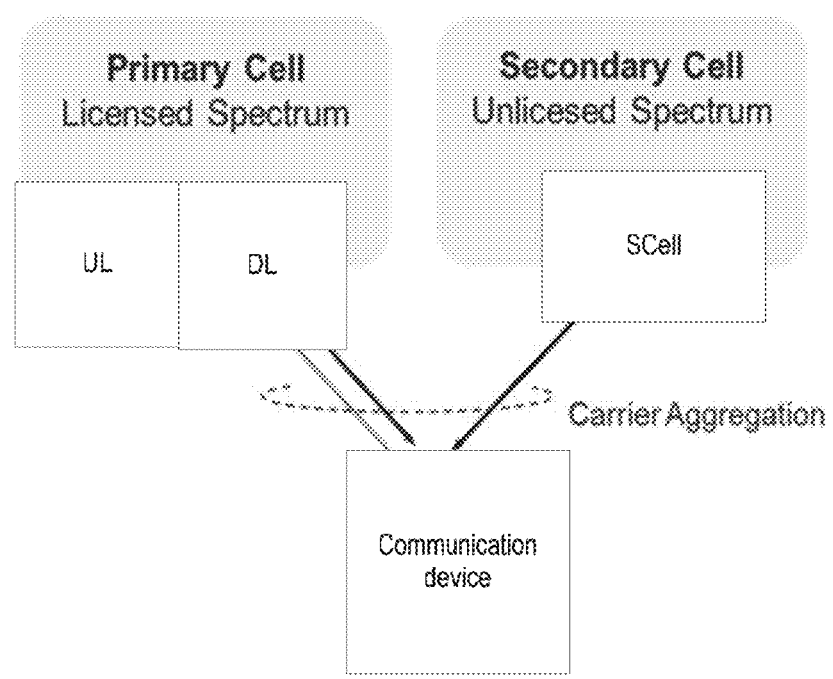
FIG. 6 illustrates a carrier-aggregation capable UE configured with one PCell and one LAA SCell.
Figure 7:
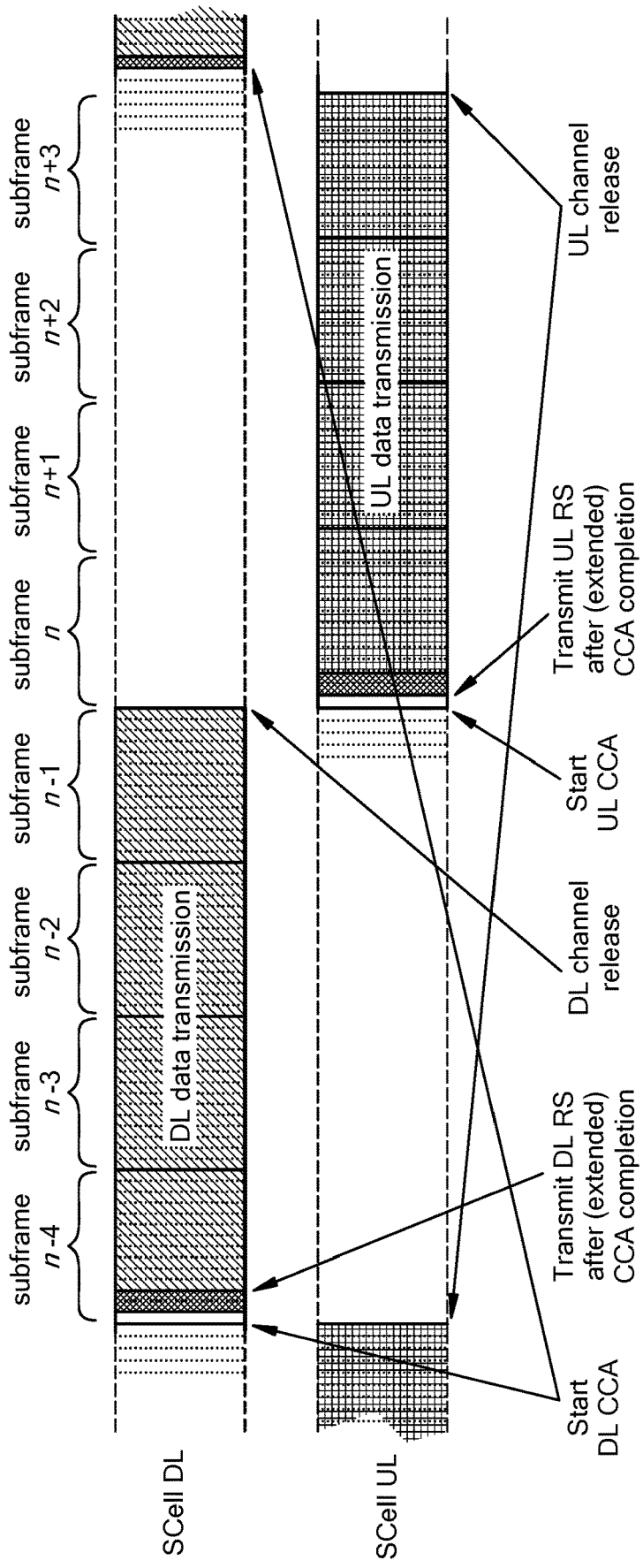
FIG. 7 illustrates different examples of LAA for the duration of a transmission burst on the LAA SCell constrained by a maximum allowed transmission duration of 4 ms.

It should be mentioned that when the network node 28 does not use partial transmission time intervals (TTIs) within a DL subframe 39, limiting gaps 33 between a DL and a UL transmission and/or between two UL transmissions from different UEs 12 becomes inefficient. The embodiment in accordance with FIG. 10 provides a method by which network node 28 manages these transitions between different UEs 12 by varying the location of the gap 33 between transmissions by successive UEs 12 within first UL subframe 35. This is shown in FIG. 7 where DL subframe 39 is followed by first UL subframe 35 and a second UL subframe 37 in which different sets of UEs 12 transmit. All the UEs 12 obtain a TA 31 command or value so that they start their transmissions earlier by a certain duration, as shown in FIG. 10. After the DL subframe 39 ends, there is a gap before transmissions on the UL begin (shown by the shaded region in FIG. 10). As shown, the gap is located after the TA in the first UL subframe 35 and at the beginning of the second UL subframe 37. Hence, the location of the gap 33 may vary from one UL subframe, i.e., first UL subframe 35, to another UL subframe, i.e., second UL subframe 37.

It should be mentioned that in the second UL subframe 37 of FIG. 10, if the gap 33 were to be in the same location within the second UL subframe 37 as for the first UL subframe 35 after the DL subframe 39 transmission, either the total gap 33 between transmissions would increase or UE 12 would have to start transmissions, pause, potentially perform a clear channel assessment (CCA) and then restart transmission. Either of these options is undesirable. In the embodiments herein, these shortcomings are addressed by allowing the gap 33 to occur in a different location within each UL subframe (i.e., first UL subframe 35 and second UL subframe 37), as illustrated in FIG. 10.

Wireless device 12 may or may not be required to perform LBT within the gap 33. The length of the gap 33 and whether LBT needs to be performed before transmissions can, in one embodiment, be sent to UEs 12 via a signal by network node 28 or, in another embodiment, be determined by the UEs 12.

Figure 11:
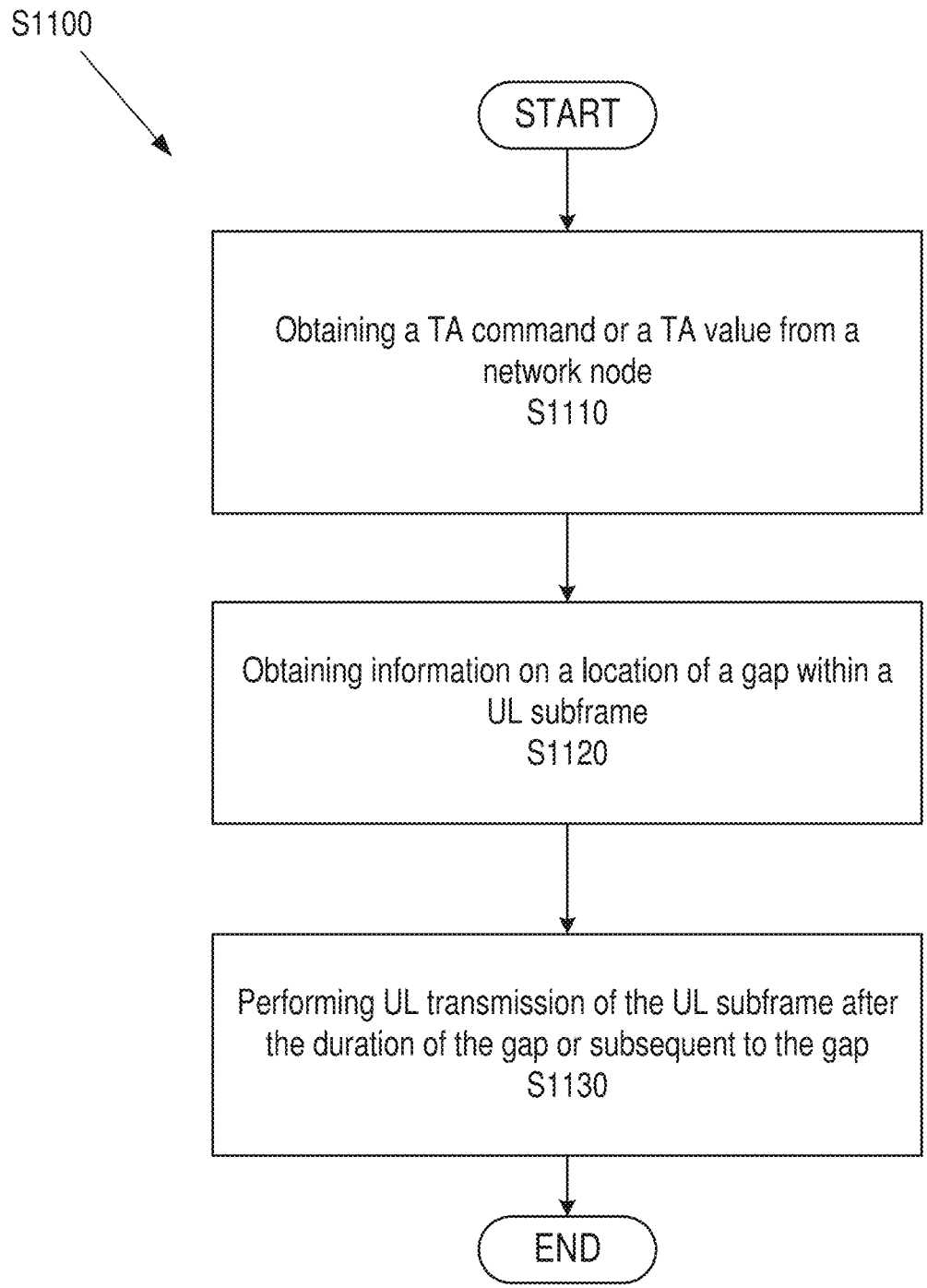
FIG. 11 is a flowchart illustrating the main method steps performed by a UE according to some of the presently disclosed embodiments.

Referring to FIG. 11, an exemplary method (S1100) performed by UE 12 in accordance with embodiments herein, is illustrated. The method comprises: obtaining a TA 31 command or a TA 31 value from the network node 28 (Block S1110); obtaining information on a location of a gap 33 within a (scheduled) first UL subframe 35 (Block S1120); and performing UL transmission(s) to the network node 28 after the duration of the gap 33 or subsequent to the gap 33 (Block S1130).

As mentioned above, UE 12 may perform the LBT procedure within the gap 33 to access the channel for transmission, or UE 12 may perform the LBT procedure after the duration of the gap 33. In one embodiment, the length of the gap 33 and/or location of the gap 33 and whether LBT needs to be performed before transmissions can be signalled to the UEs 12 by the network node 28. In another embodiment, whether or not to perform the LBT procedure may be determined by the UEs 12.

Figure 12:
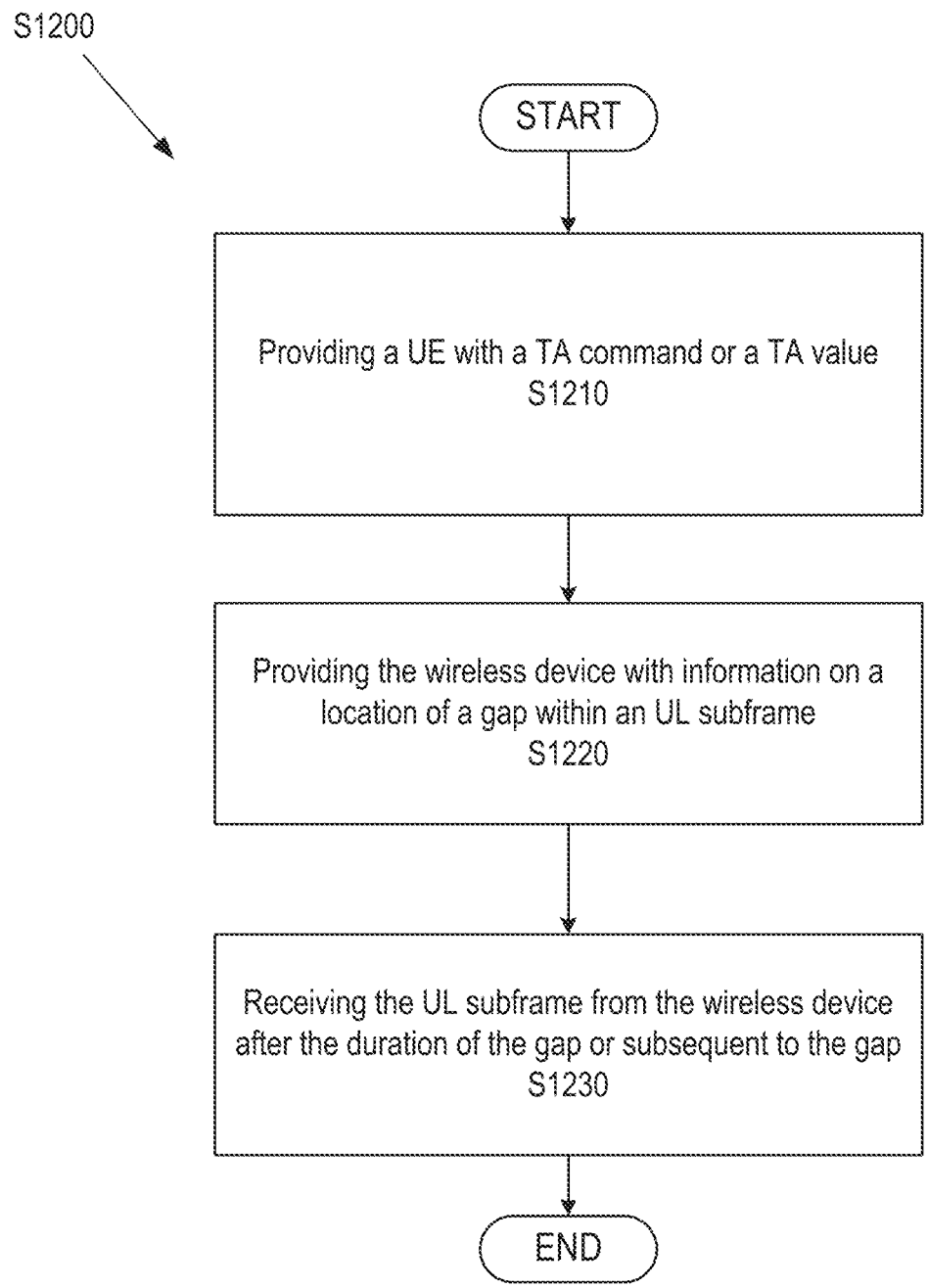
FIG. 12 is a flowchart illustrating the main method steps performed by a network node or an eNB according to some of the presently disclosed embodiments.

Referring to FIG. 12 there is illustrated an exemplary method (S1200) performed by network node 28 in accordance with embodiments herein. The method comprises: providing or signaling to UE 12 a TA 31 command or a TA 31 value (Block S1210), and providing or signaling to the UE 12 information or an indication on a location of a gap 33 within a scheduled first UL subframe 35 (Block S1220). Note that the network node 28 may also indicate to the UE 12 the length of the gap 33. Method S1200 also comprises receiving the UL subframe 35 after the duration or the gap 33 or subsequent of the gap 33 (Block S1230).

Again, in one embodiment, the length of the gap 33 and/or location of the gap 33 and whether LBT needs to be performed by the UE 12 before first UL subframe 35 transmissions can be signaled by the network node 28 to the UEs 12(s). In another embodiment, whether or not to perform the LBT procedure maybe determined by the UEs 12.

For example, and according to an embodiment herein, when the UE 12 is directed to use a gap 33 of fixed duration for LBT within the first UL subframe 35, it is beneficial for the network node 28 to signal to the UE 12 where the gap 33 should be located. For example, the network node 28 could send a notification to the UE 12 to indicate to the UE 12 whether the gap 33 should be delayed by a duration equal to the signaled TA 31 value relative to the start of the first UL subframe 35 or not.

According to another exemplary embodiment, when a gap 33 of a fixed duration of, e.g., 25 μs or 16 μs is used, there may be situations where it is beneficial for the gaps 33 to appear in different locations within the first discrete Fourier transform spread orthogonal frequency division multiplexing (DFTS-OFDM) symbol 41 within the UL subframe (i.e., second UL subframe 37). Signaling this aspect to the UE 12 lets the UE 12 be aware whether the previous subframe is a DL subframe 39 or a UL subframe, i.e., first UL subframe 35 or second UL subframe 37, and it is not desirable to force the UE 12 to perform a DL subframe 39 detection before the first UL subframe 35 it transmits. If one considers the two options for the placement of the gap 33 at the beginning of the first UL subframe 35 or after the DL subframe 39 ends, one way to achieve this would be to signal to the UE 12 whether it should assume the gap 33 occurs after a period equal to the signaled TA 31 value relative to the UL subframe boundary or whether the gap 33 occurs immediately after the subframe boundary.

It is known that the network node 28 may signal to a UE 14 whether an LBT procedure with an exponential random backoff, also known as a category 4 LBT scheme, is to be used or whether an LBT procedure encompassing a single CCA within an interval of fixed duration (e.g., 25 μs) is to be used. In the following exemplary embodiment, a gap 33 with a fixed duration is signaled for use by the UE 12 and the location of this gap 33 within a larger interval is also signaled. Alternately, the signaling may specify the time at which the UE 12 should commence its transmission with the interval of fixed duration occurring right before the start of the UL transmission. The larger interval may be, for example, of length 1 DFTS-OFDM symbol 41 in LTE. The length of the interval may be several DFTS-OFDM symbols 41 as well, e.g. 2, 3, 4, 5 etc.

The signaling (from the network node 28) of the above discussed parameters maybe performed using, according to an exemplary embodiment, a PDCCH DCI (Physical downlink control channel downlink control indicator) which is already used in LTE but may also be used for signaling LBT related parameters. According to another exemplary embodiment, the parameters above may be signaled in an UL grant or UL grants that can be communication in a UE-specific manner.

As an exemplary embodiment, the LAA UL LBT parameters discussed above maybe signaled to a UE 12 or a plurality of UEs 12, and include LBT in a gap 33 of duration of X μs, e.g., 25 μs or 16 μs with one of the following options to be used by the UE 12 (transmission may start in the second OFDM symbol 41): a) the gap starts at the beginning of the UL subframe (i.e., first UL subframe 35); or b) the gap 33 starts TA 31 microseconds after the beginning of the UL subframe (i.e., first UL subframe 35).

It should be noted that in the absence of new UL LBT parameters discussed above, a UE 12 may assume the previously signaled LBT parameters. It is, for example, the responsibility of network node 28 to ensure that channel access requirements are fulfilled.

The set of locations for the gap 33 with fixed duration within the larger interval may be limited. For instance, there may be a few locations where the gap 33 may occur, one at the beginning of the subframe, one at a location that is a function of the TA 31 command issued to UE 12 and one at the end of the 1st OFDM symbol 41 in the subframe. Signaling may then be used to indicate to the UE 12, which of the limited set of locations should be used by the UE 12 for the gap 33.

In an exemplary embodiment, signaling may first indicate to the UE 12 whether the network node 28 is using variable locations or fixed locations for the gap 33 with fixed duration. This may be achieved via signaling that is sent only semi-statically such as radio resource control (RRC) signaling. Dynamic signaling informing a UE 12 where the gap 33 of fixed duration should be performed is used when, for example, the semi-static RRC signaling indicates that the location of the gap 33 is being varied.

According to another exemplary embodiment, signaling may not be required to indicate where the location of the gap 33 is within the larger interval. This may be conveyed/obtained implicitly to/by the UE 12. One way to achieve this is by the location of the gap 33 being inferred from other signaling parameters that have been indicated to the UE 12. For instance, if a TA 31 command or value is conveyed to the UE 12, then, the UE 12 may delay the occurrence of the gap 33 relative to the start of the first UL subframe 35 by an amount that is a function of this timing advance 31 command if the UE 12 is scheduled within the first UL subframe 35 after the DL subframe 39. If the UE 12 is scheduled in a subsequent subframe, i.e., second UL subframe 37, UE 12 may assume that the gap 33 occurs right at the start of the second UL subframe 37. This could be a default mode of operation that does not necessarily need any additional signaling (other than the timing advance 31). The function of the timing advance 31 used may depend on the default timing advance 31 value that is to be used by the UE 12. This exemplary embodiment is suitable for small cells with a size low enough that different TA 31 values do not need to be distributed to different UEs 12 to align transmissions at the network node 28 receiver circuit 34.

According to yet another exemplary embodiment, in addition to the parameters used in the previous embodiment(s), the UE 12 may use an additional parameter, i.e., whether or not the network node 28 is employing partial transmission time interval (TTIs) within the DL subframe 39 immediately preceding the first UL subframe 35 to determine whether the location of the gap 33 should be varied or not. A procedure (S1300) that can infer this implicitly is shown in FIG. 13.

Figure 13:
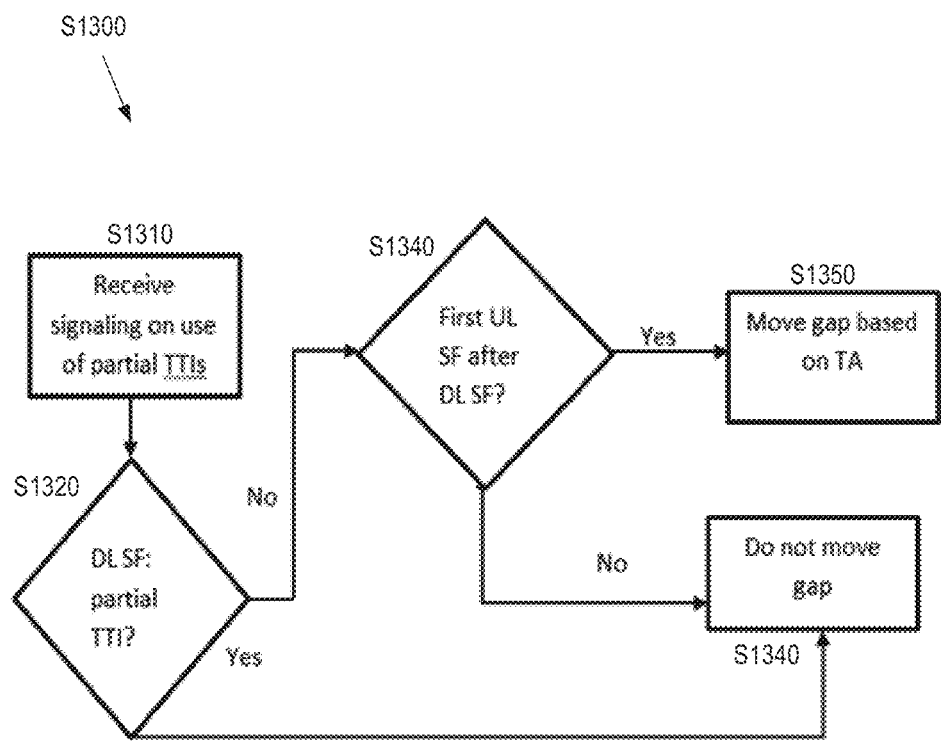
FIG. 13 is a procedure to implicitly vary the location of a gap between UL transmissions from different UEs when a network node(s) or eNB(s) signal to UEs whether TTIs are used in a DL subframe according to some embodiments of the present disclosure.

As shown in FIG. 13, a UE 12 receives signaling on use of a partial TTI (Block S1310) and also receives a TA 31 command or value. UE 12 determines whether the DL subframe (SF) 39 is partial or not based on the received information (Block S1320). If it is determined that the DL subframe (SF) 39 is a partial TTI (yes), no movement of the gap 33 is performed (Block S1340). If it is determined that the DL subframe (SF) 39 is not a partial TTI, it is determined whether the first UL SF 35 is after the DL SF 39 (Block S1340). If it is determined that the first UL SF 35 is after the DL SF 39 (yes) in, the gap 33 is moved based the length or value of the TA 31 command (Block S1350). If it is determined that the first UL SF 35 is not after the DL SF 39 (no), the gap 33 is not moved (Block S1340).

In a variation of the above exemplary embodiment, the UE 12 could also receive a semi-static indication from the network node 28 regarding whether the network node 28 is currently employing partial TTIs in general. If the network node 28 is using partial TTIs, the gap 33 may not be moved by the UE 12 without trying to monitor whether the immediate subframe before a UL subframe (i.e., first UL subframe 35) is a DL subframe 39 with a partial TTI or not. In this case, the network node 28 may use a partial TTI in every subframe that immediately precedes a UL subframe (i.e., first UL subframe 35) where the network node 28 would like the UE 12 to have a gap of a certain duration.

In yet another exemplary embodiment, gaps 33 may be present in both the first and last DFTS-OFDM symbols 41 of the subframe that may have a different duration. For instance, the gap 31 in the first DFTS-OFDM symbol 41 may be, for example, 25 μs long whereas the gap 33 in the last DFTS-OFDM symbol 41 may be the duration of the whole symbol. The choice of when to use gaps 33 in the last DFTS-OFDM symbol 41 in addition to the first DFTS-OFDM symbol 41 may be determined based on the type of LBT procedure that has been indicated for the UEs 12 to use in the next subframe. In a non-limiting example, the gap 33 in the end of a subframe may be created in LTE by indicating to the UEs 12 that the last symbol in a subframe is not to be used due to the presence of, e.g., a reference signal, e.g., sounding reference signal (SRS) transmissions by other UEs 12 in that symbol. However, no UEs 12 are scheduled to transmit SRS in this symbol so that the whole symbol is available for LBT.

Figure 14:
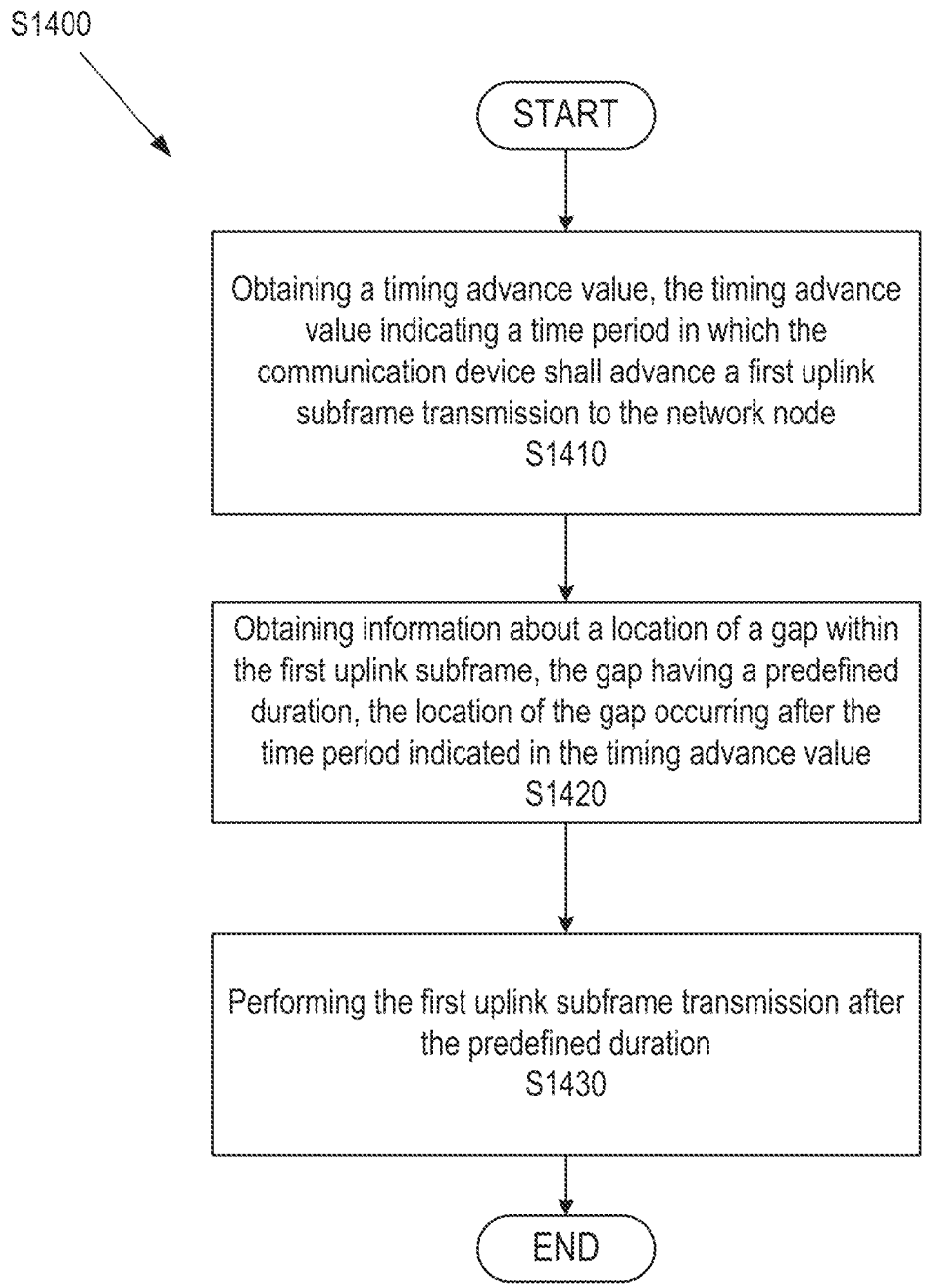
FIG. 14 is a flowchart illustrating an alternate exemplary method performed by a UE according to embodiments of the present disclosure.

FIG. 14 is a flowchart of another embodiment of the present disclosure. FIG. 14 illustrates a method S1400 in a UE 12, for managing uplink transmissions from the UE 12 to a network node 28. In one embodiment, method S1400 comprises obtaining, a timing advance 31 value, the timing advance value indicating a time period in which the UE 12 shall advance a first uplink subframe 35 transmission to the network node 28 (Block S1410), obtaining information about a location of a gap 33 within the first uplink subframe 35, the gap 33 having a predefined duration, the location of the gap 33 occurring after the time period indicated in the timing advance 31 value (Block S1420), and performing the first uplink subframe 35 transmission after the predefined duration (Block S1430). These steps may be performed by processor 20 in conjunction with uplink transmission code 26. Processor 20 may configure communication interface 29 to perform some or all of the aforementioned steps.

In one embodiment, the location of a gap 33 in a second uplink subframe 37 is different than the location of the gap 33 in the first uplink subframe 35.

In one embodiment, the method further comprises performing a listen-before-talk (LBT) procedure either during the predefined duration of the gap 33 or after the predefined duration of the gap 33.

In one embodiment, the method further comprises receiving, from the network node 28, a notification indicating at least one of the predefined duration of the gap 33, the location of the gap 33 within the first uplink subframe 35, and whether the LBT procedure is to be performed.

In one embodiment, the method further comprises receiving, from the network node 28, a notification indicating that the gap 33 should be delayed by a timeframe equal to the time period in the timing advance 31 value relative to a start of the first uplink subframe 35.

In one embodiment, the notification from the network node 28 indicating at least one of the predefined duration of the gap 33, the location of the gap 33 within the first uplink subframe 35, and whether the LBT procedure is to be performed is transmitted using a physical dedicated control channel PDCCH) downlink control indicator (DCI).

In one embodiment, the notification from the network node 28 indicating at least one of the predefined duration of the gap 33, the location of the gap 33 within the first uplink subframe 35, and whether the LBT procedure is to be performed, is provided in an uplink grant.

In one embodiment, the method further comprises receiving a notification from the network node 28 indicating that the gap 33 should occur at one of a beginning of the first uplink subframe 35, a location within the first uplink subframe 35 that is a function of the time period indicated by the timing advance 31 value, and at an end of a first orthogonal frequency division multiplexing, OFDM, symbol 41 in the first uplink subframe 35.

In one embodiment, the method further comprises receiving a notification from the network node 28 indicating whether the location of the gap 33 is fixed or variable.

In one embodiment, the method further comprises determining that the gap 33 in the first uplink subframe 35 occurred after the time period indicated in the timing advance 31 value, establishing another gap 33 at the start of the second uplink subframe 37, and implementing the other gap 33 at the start of a second uplink subframe 37.

In one embodiment, the method further comprises receiving a notification from the network node 28 indicating whether the network node 28 is employing partial transmission time intervals (TTIs) within a downlink subframe 39 immediately preceding the first uplink subframe 35, determining whether the downlink subframe 39 is partial based on the received notification. If it is determined that the downlink subframe 39 is partial, the method further comprises maintaining the location of the gap 33 within the first uplink subframe 35. If it is determined that the downlink subframe (39) is not partial, the method further comprises determining if the first uplink subframe 35 occurs after the downlink subframe 39, and moving the location of the gap 33 based on the time period in the timing advance 31 value if the first uplink subframe 35 occurs after the downlink subframe 39.

In one embodiment, the location of the gap 33 is in a first discrete-Fourier-transform spread-orthogonal frequency division multiplexing (DFTS-OFDM) symbol 41 of the first uplink subframe 35 and a location of a second gap 33 is in a last DFTS-OFDM symbol 41 of the first uplink subframe 35, wherein the predefined duration of the gap 33 and the predefined duration of the second gap 33 are different.

In one embodiment, implementing the location of the second gap in the last DFTS-OFDM symbol 41 of the first uplink subframe 35 is based on a type of listen-before-talk (LBT) procedure indicated for the communication device 12 in a second uplink subframe 37.

Figure 15:
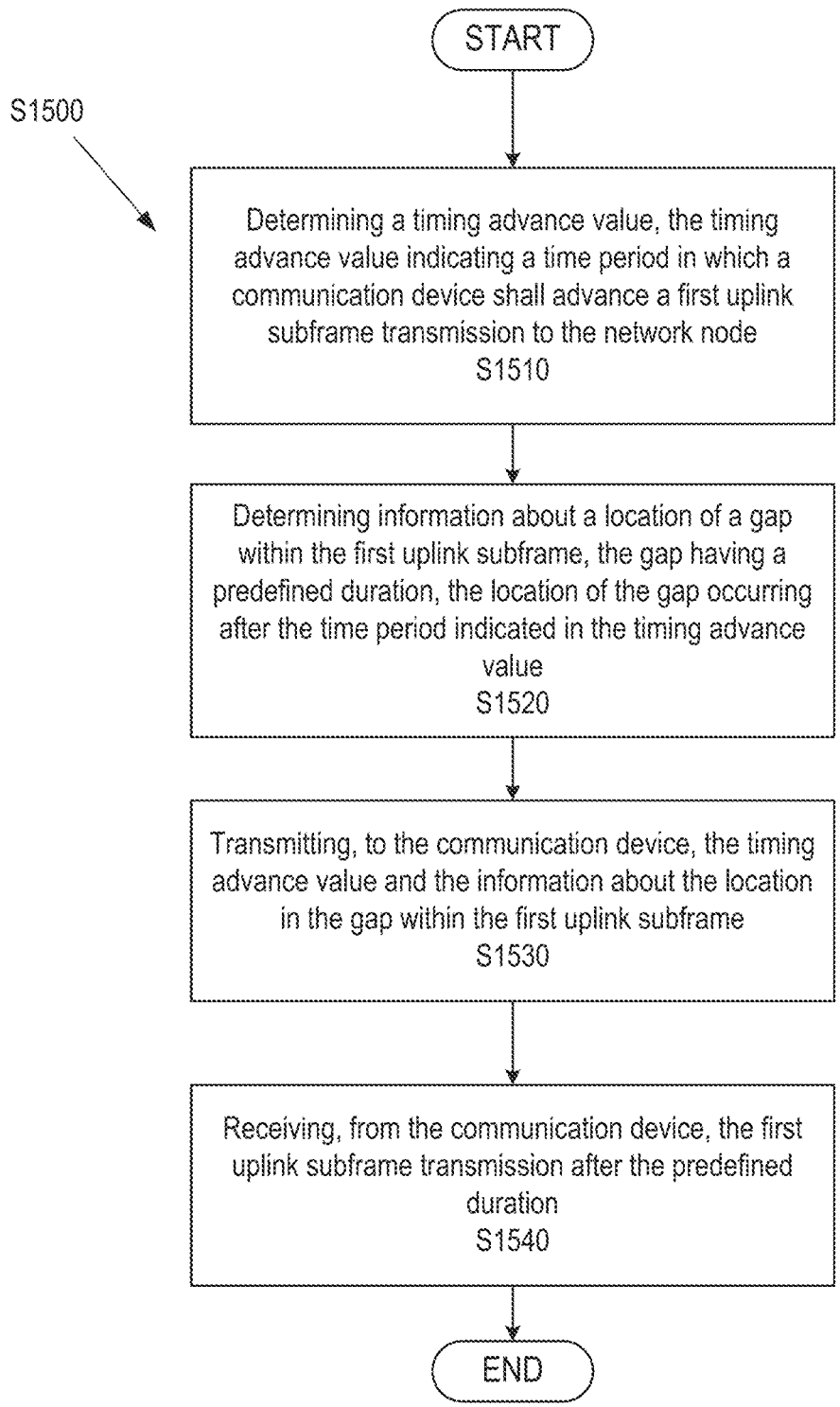
FIG. 15 is a flowchart illustrating an alternate an exemplary method performed by a network node according to some embodiments of the present disclosure.

FIG. 15 a flowchart of another embodiment of the present disclosure. FIG. 15 illustrates a method S1500 in a network node 28, for managing uplink transmissions with a UE 12. In one embodiment, method S1500 comprises determining, by processor 36 in conjunction with TA and gap generation code 42, a timing advance 31 value, the timing advance 31 value indicating a time period in which a UE 12 shall advance a first uplink subframe 35 transmission to the network node 28 (Block S1510), determining, by processor 36 in conjunction with TA and gap generation code 42, information about a location of a gap 33 within the first uplink subframe 35, the gap 33 having a predefined duration, the location of the gap 33 occurring after the time period indicated in the timing advance 31 value (Block S1520), transmitting, via communication interface 45, to the UE 12, the timing advance 31 value and the information about the location in the gap 33 within the first uplink subframe 35 (Block S1530), and receiving, via communication interface 45, from the UE 12, the first uplink subframe 35 transmission after the predefined duration (Block S1540). In one embodiment, the location of a gap 33 in a second uplink subframe 37 is different than the location of the gap 33 in the first uplink subframe 35.

In one embodiment, the method further comprises transmitting, to the communication device 12, a notification indicating at least one of the predefined duration of the gap 33, the location of the gap 33 within the first uplink subframe 35, and whether a listen-before-talk, LBT, procedure is to be performed.

In one embodiment, the method further comprises transmitting, to the communication device 12, a notification indicating that the gap 33 should be delayed by a timeframe equal to the time period in the timing advance 31 value relative to a start of the first uplink subframe 35.

In one embodiment, the notification to the communication device 12 indicates at least one of the predefined duration of the gap 33, the location of the gap 33 within the first uplink subframe 35, and whether the LBT procedure is to be performed is transmitted using a physical dedicated control channel (PDCCH) downlink control indicator (DCI).

In one embodiment, the notification to the communication device 12 indicates at least one of the predefined duration of the gap 33, the location of the gap 33 within the first uplink subframe 35, and whether the LBT procedure is to be performed, is provided in an uplink grant.

In one embodiment, the method further comprises transmitting, to the communication device 12, a notification indicating that the gap 33 should occur at one of a beginning of the first uplink subframe 35, a location within the first uplink subframe 35 that is a function of the time period indicated by the timing advance 31 value, and at an end of a first orthogonal frequency division multiplexing (OFDM) symbol 41 in the first uplink subframe 35.

In one embodiment, the method further comprises transmitting, to the communication device 12, a notification indicating whether the location of the gap 33 is fixed or variable.

In one embodiment, the method further comprises transmitting, to the communication device 12, a notification indicating if the network node 28 is employing partial transmission time intervals (TTIs), within a downlink subframe 39 immediately preceding the first uplink subframe 35.

Figure 16:
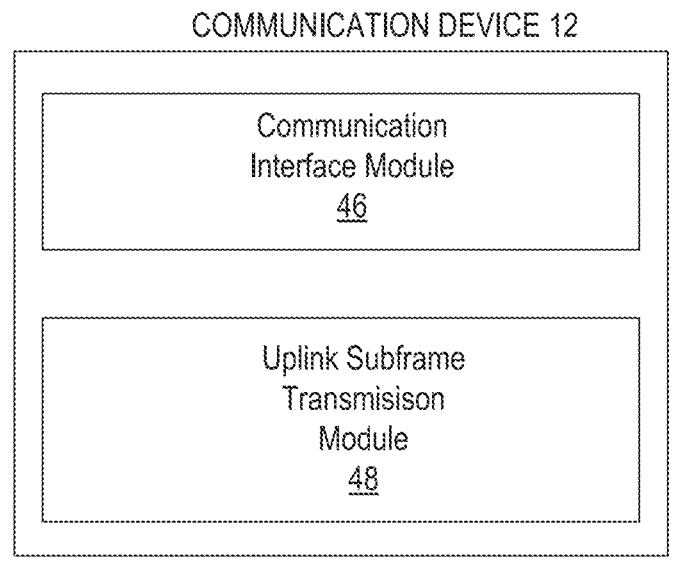
FIG. 16 is a block diagram illustrating an alternate UE configured to perform the methods described herein according to some embodiments of the present disclosure.

FIG. 16 is a block diagram of an alternate UE 12 configured to manage uplink transmissions in accordance with an embodiment of the present disclosure. In FIG. 16, UE 12 comprises a communication interface module 46 and an uplink subframe transmission module 48 configured to obtain a timing advance 31 value, the timing advance 31 value indicating a time period in which the UE 12 shall advance a first uplink subframe 35 transmission to a network node 28, obtain information about a location of a gap 33 within the first uplink subframe 35, the gap 33 having a predefined duration, the location of the gap 33 occurring after the time period indicated in the timing advance 31 value, and configure the communication interface module 46 to perform the first uplink subframe 35 transmission after the predefined duration.

Figure 17:
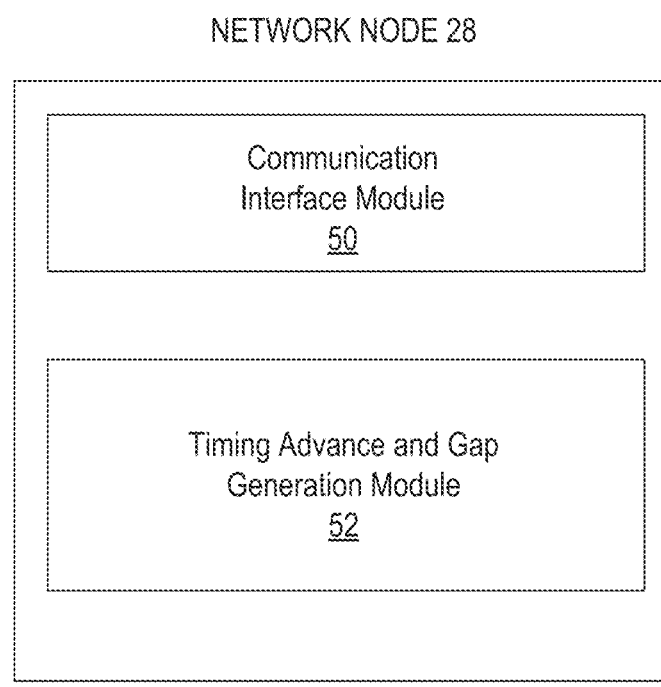
FIG. 17 is a block diagram illustrating an alternate network node configured to perform the methods described herein according to some embodiments of the present disclosure.

FIG. 17 is a block diagram of an alternate network node 28 configured to manage uplink transmissions in accordance with an embodiment of the present disclosure. In FIG. 17, network node 28 comprises a timing advance and gap generation module 52 configured to determine a timing advance 31 value, the timing advance 31 value indicating a time period in which a UE 12 shall advance a first uplink subframe 35 transmission to a network node 28, and determine information about a location of a gap 33 within the first uplink subframe 35, the gap 33 having a predefined duration, the location of the gap 33 occurring after the time period indicated in the timing advance 31 value. Network node 28 also comprises a communication interface module 50 configured to transmit, to the UE 12, the timing advance 31 value and the information about the location in the gap 33 within the first uplink subframe 35, and receive, from the UE 12, the first uplink subframe 35 transmission after the predefined duration.

An advantage achieved with the embodiments disclosed herein is higher UL users and a better system performance.

Another advantage is to increase the probability that concurrently scheduled UEs 12 access an unlicensed spectrum simultaneously in an efficient manner to achieve the gains due to multi-user multiplexing. In other words, the network node 28, according to embodiments herein, provides techniques to at least mitigate the interference caused by its own UEs 12. Since the network node 28 is in control of all transmissions by the UEs 12, the network node 28 herein further controls the channel access parameters when it is beneficial, such that the chance that all scheduled UEs 12 for a scheduling unit may access the channel simultaneously would increase. In other words, by controlling the channel access parameters, network node 28 is capable of avoiding situations where one of the concurrently scheduled UEs 12 has failed to access to the channel due to transmission by another UE 12 which is scheduled by the same network node 28 for the same subframe.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP LTE and LAA have been used in this disclosure to exemplify the invention, this should not be seen as limiting the scope of the invention to only the aforementioned system. Other wireless systems, including LTE-Advanced (LTE-A), Universal Mobile Telecommunications Service (UMTS), Worldwide Interoperability of Microwave Access (WiMax), and wireless local area network (WLAN) that employ LBT may also benefit from exploiting the solutions ideas covered within this disclosure.

Abbreviation Explanation

CCA Clear Channel Assessment
DCF Distributed Coordination Function
DIFS DCF Inter-frame Spacing
DL Downlink
DRS Discovery Reference Signal
DCI Downlink Control Information
DFTS-OFDM Discrete Fourier Transform Spread Orthogonal Frequency Division Multiplexing
eNB evolved NodeB, base station
LAA Licensed Assisted Access
LBT Listen Before Talk
PDCCH Physical Downlink Control Channel
PIFS PCF Inter-frame Spacing
PCell Primary Cell
PUSCH Physical Uplink Shared Channel
QoS Quality of Service
SCell Secondary Cell
SIFS Short Inter-frame Spacing
SRS Sounding Reference Signal
UE User Equipment
UL Uplink As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a communication device configured to communicate with a network node, the method comprising:
determining a first location of a first gap within a first uplink subframe based at least in part on a notification and information at least about the first location of the first gap, the first uplink subframe to be transmitted to the network node, the notification indicating whether the network node is employing partial transmission time intervals, TTIs, within a downlink subframe immediately preceding the first uplink subframe, the first location of the first gap being in a first symbol of the first uplink subframe, a second location of a second gap being in a last symbol of the first uplink subframe; and transmitting to the network node the first uplink subframe after a first predefined duration of the first gap.

2. The method of claim 1, wherein the method further includes receiving at least one of:
   a timing advance value, the timing advance value indicating a time period the communication device advances a first uplink subframe transmission to the network node;
   the notification from the network node; and
   the information at least about the first location of the first gap within the first uplink subframe.

3. The method of claim 2, wherein the method further includes:
   determining the first location of the first gap occurs after the time period indicated in the timing advance value.

4. The method of claim 2, wherein the method further includes:
   determining whether the downlink subframe is partial based on the received notification.

5. The method of claim 4, wherein the determining the first location of the first gap within the first uplink subframe includes:
   if the downlink subframe is partial:
      maintaining the first location of the first gap within the first uplink subframe; and
   if the downlink subframe is not partial:
      moving the first location of the first gap based on the time period in the timing advance value.

6. The method of claim 1, wherein the first predefined duration of the first gap and a second predefined duration of the second gap are different.

7. The method of claim 6, wherein the method further includes:
   performing a listen-before-talk, LBT, procedure at least one of during the first predefined duration of the first gap and after the first predefined duration of the first gap.

8. The method of claim 1, wherein the second location of the second gap in the last symbol of the first uplink subframe is determined based on a type of listen-before-talk, LBT, procedure indicated to the communication device in a second uplink subframe.

9. The method of claim 1, wherein the method further includes:
   establishing a third gap at a start of a second uplink subframe; and
   implementing the third gap at the start of the second uplink subframe.

10. The method of claim 1, wherein the first symbol is a first discrete-Fourier-transform spread-orthogonal frequency division multiplexing, DFTS-OFDM, symbol, and the last symbol is a last DFTS-OFDM symbol.

11. A communication device configured to communicate with a network node, the communication device comprising:
    processing circuitry configured to:
       determine a first location of a first gap within a first uplink subframe based at least in part on a notification and information at least about the first location of the first gap, the first uplink subframe to be transmitted to the network node, the notification indicating whether the network node is employing partial transmission time intervals, TTIs, within a downlink subframe immediately preceding the first uplink subframe, the first location of the first gap being in a first symbol of the first uplink subframe, a second location of a second gap being in a last symbol of the first uplink subframe; and
    a communication interface configured to:
       transmit to the network node the first uplink subframe after a first predefined duration of the first gap.

12. The communication device of claim 11, wherein the communication interface is further configured to receive at least one of:
    a timing advance value, the timing advance value indicating a time period the communication device advances a first uplink subframe transmission to the network node;
    the notification from the network node; and
    the information at least about the first location of the first gap within the first uplink subframe.

13. The communication device of claim 12, wherein the processing circuitry is further configured to:
    determine the first location of the first gap occurs after the time period indicated in the timing advance value.

14. The communication device of claim 12, wherein the processing circuitry is further configured to:
    determine whether the downlink subframe is partial based on the received notification.

15. The communication device of claim 14, wherein the determining the first location of the first gap within the first uplink subframe includes:
    if the downlink subframe is partial:
       maintaining the first location of the first gap within the first uplink subframe; and
    if the downlink subframe is not partial:
       moving the first location of the first gap based on the time period in the timing advance value.

16. The communication device of claim 11, wherein the first predefined duration of the first gap and a second predefined duration of the second gap are different.

17. The communication device of claim 16, wherein the processing circuitry causes the communication device to:
    perform a listen-before-talk, LBT, procedure at least one of during the first predefined duration of the first gap and after the first predefined duration of the first gap.

18. The communication device of claim 11, wherein the second location of the second gap in the last symbol of the first uplink subframe is determined based on a type of listen-before-talk, LBT, procedure indicated to the communication device in a second uplink subframe.

19. The communication device of claim 11, wherein the processing circuitry is further configured to:
    establish a third gap at a start of a second uplink subframe; and
    implement the third gap at the start of the second uplink subframe.

20. The communication device of claim 11, wherein the first symbol is a first discrete-Fourier-transform spread-orthogonal frequency division multiplexing, DFTS-OFDM, symbol, and the last symbol is a last DFTS-OFDM symbol.

* * * * *